(12) United States Patent
Kavantzas et al.

(10) Patent No.: US 8,782,757 B2
(45) Date of Patent: Jul. 15, 2014

(54) SESSION SHARING IN SECURE WEB SERVICE CONVERSATIONS

(75) Inventors: Nickolas Kavantzas, Emerald Hills, CA (US); Jiandong Guo, Palo Alto, CA (US); Pratibha Gupta, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 128 days.

(21) Appl. No.: 13/461,719

(22) Filed: May 1, 2012

(65) Prior Publication Data

US 2013/0086652 A1 Apr. 4, 2013

Related U.S. Application Data

(60) Provisional application No. 61/541,983, filed on Sep. 30, 2011.

(51) Int. Cl.
*G06F 15/16* (2006.01)
*G06F 17/30* (2006.01)
*G06F 7/04* (2006.01)
*H04L 29/06* (2006.01)
*H04L 9/32* (2006.01)
*H04K 1/00* (2006.01)

(52) U.S. Cl.
USPC .................. 726/5; 726/4; 713/168; 713/171; 380/270

(58) Field of Classification Search
USPC ................. 713/150, 168–174, 182–186, 202; 709/225, 229; 726/2–8, 22–23
See application file for complete search history.

(56) References Cited

U.S. PATENT DOCUMENTS

| | | |
|---|---|---|
| 6,516,416 B2 | 2/2003 | Gregg et al. |
| 7,290,288 B2 | 10/2007 | Gregg et al. |
| 2007/0022289 A1* | 1/2007 | Alt et al. ........................ 713/168 |
| 2011/0296510 A1* | 12/2011 | Hatlelid et al. ................... 726/7 |
| 2012/0317624 A1* | 12/2012 | Monjas Llorente et al. ...... 726/4 |

OTHER PUBLICATIONS

"Web Services Policy 1.5—Framework W3C Recommendation" The World Wide Web Consortium (Sep. 4, 2007).
"Web Services Security:SOAP Message Security 1.0 (WS—Security 2004) OASIS Standard 200401" Organization for the Advancement of Structured Information Standards (Mar. 2004).

(Continued)

*Primary Examiner* — Evans Desrosiers
(74) *Attorney, Agent, or Firm* — Kilpatrick Townsend & Stockton LLP

(57) ABSTRACT

Techniques are disclosed for sharing communication session information sharing in web service applications. The techniques include management of concurrent sessions by dynamically determining the session association of web service requests at runtime. These sessions can be shared by a group of web services on the server side, and across multiple web services clients with many users, independently of where these applications reside. Session identifiers are determined for these concurrent web service invocations based on an algorithm that uses information from configuration and runtime data. Different information is used in the session identifier depending on configuration parameters to provide different types of sharing that correspond to different use cases. This mechanism can be used with SOAP-based web services, REST-based web services, and the like.

22 Claims, 14 Drawing Sheets

(56) References Cited

OTHER PUBLICATIONS

"Web Services Security: SOAP Message Security 1.1 (WS—Security 2004)" Organization for the Advancement of Structured Information Standards (Feb. 1, 2006).

"Web Services Security Policy Language (WS—SecurityPolicy) Version 1.1" International Business Machines Corporation, Microsoft Corporation, RSA Security Inc., and VeriSign Inc. (Jul. 2005).

"WS—Security Policy 1.3 OASIS Committee Specification 01," Organization for the Advancement of Structured Information Standards (Nov. 29, 2008).

"WS—Trust 1.3 OASIS Standard," Organization for the Advancement of Structured Information Standards (Mar. 19, 2007).

"WS—Trust 1.4 OASIS Standard incorporating Approved Errata 01," Organization for the Advancement of Structured Information Standards (Apr. 25, 2012).

"WS—SecureConversation 1.3 OASIS Standard," Organization for the Advancement of Structured Information Standards (Mar. 1, 2007).

"WS—SecureConversation 1.4 OASIS Standard," Organization for the Advancement of Structured Information Standards (Feb. 2, 2009).

"WS—SecurityPolicy Examples Working Draft 20," Organization for the Advancement of Structured Information Standards (Feb. 3, 2009).

"Reliable Secure Profile Version 1.0 Working Group Draft—revision 11," Web Services Interoperability Organization (Oct. 25, 2007).

* cited by examiner

SESSION SHARING IN SECURE WEB SERVICE CONVERSATIONS

CROSS-REFERENCES TO RELATED APPLICATIONS

The present application claims the benefit and priority under 35 U.S.C. 119(e) of U.S. Provisional Application No. 61/541,983, filed Sep. 30, 2011, entitled "SESSION SHARING AND RE-AUTHENTICATION IN SECURE WEB SERVICE CONVERSATIONS," the entire contents of which are incorporated herein by reference for all purposes.

The present application also incorporates by reference for all purposes the entire contents of the following commonly-assigned application, which is filed concurrently with the present application:

U.S. Non-Provisional application Ser. No. 13/461,702, entitled "RE-AUTHENTICATION IN SECURE WEB SERVICE CONVERSATIONS".

BACKGROUND

Embodiments of the present invention relate generally to data communication security, and more particularly to techniques for providing secure conversations between entities in service-oriented systems.

Existing web services specifications such as WS-Security and WS-Trust provide features for secure communication. WS-Security provides the basic framework for message level security in web services, and WS-Trust deals with the issuing, renewal, and validation of security tokens, as well as with ways to establish and broker trust relationships.

SUMMARY

In a first aspect, Web services operations involve clients invoking operations by sending requests to services. The services perform the requested operations and send the results back to the clients in responses. The clients communicate the requests to the service and receive the responses from the service using information in communications sessions, such as secret keys for encryption and decryption of requests and responses. Communication sessions that have one or more attributes in common can be shared by multiple invocations. The information that can be shared across invocations includes security information, such as encryption keys. Sharing of encryption keys can improve system performance because, for example, key generation and exchange can be performed once for multiple invocations across which the keys can be reused. The terms "client" and "service" as used herein can refer to, for example, an invoking and an invoked SOA component, respectively. The term session is used herein to refer to session information, e.g., the data such as a secret key associated with communication between a client and a service. Although the secret key is referred to herein as session information, the session information can include other information in addition to or instead of the secret key.

In one aspect, several different sharing modes, which can be understood as different granularities or degrees of sharing, are provided. In one or more embodiments, the sharing mode for a particular web service invocation is a configurable option that can be specified by a system administrator or other user based on information such as the likely communication patterns between SOA clients and services. In one embodiment, in order of increasing degree of potential sharing, client-side sessions associated with the same user credentials can be shared (1) across multiple web service requests (e.g., request messages) by the same user on a single client, which is referred to herein as a "no client sharing" mode, (2) on multiple clients communicating with a single service, which is referred to herein as a "single service port" sharing mode or (3) on multiple clients communicating with a group of services, which is referred to as a "group of services" sharing mode. The no client sharing mode (1) can be selected if use of the same encryption key for multiple clients is not desired, e.g., if the system designer prefers that each client reference (i.e., web service client output interface) have a different encryption key for security reasons. In no client sharing mode (1), multiple client-side communication sessions (i.e., communication-related information, such as Web services security contexts) can be managed concurrently for multiple users. The single service port sharing mode (2) allows for sharing of sessions across multiple clients and can be used in for example, scenarios with multiple client references communicating with a single service, so that client sessions can be shared among the clients' references (e.g., output interfaces), e.g. so that a single secret key can be shared among the client references. The group of services sharing mode (3) can be used in, for example, scenarios with multiple client references communicating with a group of services, and is similar to the single service sharing mode (2), except that client sessions can be shared between two or more clients for communications between the clients and two or more services (e.g., input interfaces of a web service) in the group. Furthermore, a session can be shared among requests from multiple different users concurrently by authenticating the user credentials associated with each request.

In accordance with embodiments of the invention, sessions can also be shared on the service (e.g., invoked component) side. In a service port based service-side sharing mode (1), sessions are shared for service-originated communications (e.g., response messages) associated with the same service port and secret key. In a service group based service-side sharing mode, sessions are shared for service-originated communications associated with the same service group and secret key. Thus a service side sharing mode can be selected based on whether the communication is from a single service port or a group of services. Service side sharing has benefits similar to those of client side sharing, e.g., improving performance by re-using secret keys instead of regenerating them for each response.

Embodiments of the present invention provide a method that includes receiving, by a computer system at a first web service application, a first request to send a first web service message to a second web service application or group of web services; retrieving, by the computer system, first existing communication session information having the same sharing characteristics as the first request, wherein the sharing characteristics of the first request comprise environment information associated with the first web service application and request information associated with the first request; and communicating, by the computer system, the first web service message to the second application or group of web services using the first existing communication session information.

Embodiments may include one or more of the following features. In one embodiment, the first web service application may be a client application, the environment information, the request information, or a combination thereof may include first user credentials of a first user and a service locator identifying the web service to invoke, and retrieving the first existing communication session information may comprise searching, by the computer system, one or more existing communication sessions for the first existing communication session information, wherein the first existing communication session information is associated with the service locator and security credentials, and the security credentials include the first user credentials; and retrieving, by the computer system, the first existing communication session information from the one or more existing communication sessions.

In one embodiment, the method may further comprise communicating, by the computer system, a second web service message to a second application or group of web services associated with a second user, using second existing communication session information corresponding to the second user, concurrently with communicating the first web service message.

In one embodiment, the method may further comprise receiving, by a the computer system at the first web service application, a second request to send a second web service message to the second application or group of web services, the second request including second user credentials of a second user; searching, by the computer system, the one or more existing communication sessions for second existing communication session information associated with the service locator and the second user credentials; retrieving, by the computer system, the second existing communication session information from the one or more existing communication sessions; and communicating, by the computer system, the second web service message to the second application or group of web services using the second existing communication session information concurrently with communicating the first web service message.

In one embodiment, the security credentials may include endorser credentials. In one embodiment, searching one or more existing communication sessions may comprise generating, by the computer system, a requested session key based upon the service locator and security credentials, the security credentials including the user credentials; searching, by the computer system, a session table for an existing entry having an associated session key matching the requested session key; and retrieving the existing communication session comprises retrieving, by the computer system, the existing entry.

In one embodiment, the method may further comprise creating, by the computer system, a new entry in the session table when there is no entry in the session table having an associated session key matching the requested session key.

In one embodiment, the first request may be a request to send the web service message to a web service URL included in the first request, and the service locator comprises the web service URL.

In one embodiment, the first request may be a request to send the web service message to a to a web service belonging to a configured web services group, and the service locator comprises the web service group identifier.

In one embodiment, the environment information may further include a client reference identifier, and retrieving the existing communication session information may comprise searching, by the computer system, one or more existing communication sessions for an existing session associated with the client reference identifier, service locator, and security credentials; and retrieving, by the computer system, the existing session from the one or more existing communication sessions.

In one embodiment, the first web service application may be a service, the environment information or the request information may include a service locator associated with the service, and retrieving the existing communication session information may comprise retrieving, by the computer system, a secret key identifier from the request; searching, by the computer system, one or more existing communication sessions for an existing session associated with the service locator and secret key identifier; and retrieving, by the computer system, the existing session from the one or more existing communication sessions.

In one embodiment, the service locator may include a service port identifier that identifies the service. In one embodiment, the service may be a member of a group of services, and the service locator may comprise a service group identifier that identifies the group of services.

Embodiments of the present invention provide a system that includes a memory and a processor configured to receive, at a first web service application, a request to send a first web service message to one or more second web services; determine a session identifier based upon web service environment information associated with the first web service application, request information associated with the request, or a combination thereof; retrieve from the memory first existing session information associated with the session identifier; and communicate the first message to the one or more second web services using the first existing session information.

Embodiments of the invention may provide one or more of the following features. In one embodiment, the environment information, the request information, or a combination thereof, may include a client reference identifier, a service locator that identifies the one or more web services, and security credentials, and the system may be further configured to communicate one or more subsequent messages to the one or more second web services using the existing session information.

In one embodiment, the web service environment information, the request information, or a combination thereof may include a first user credentials associated with a first user and second user credentials associated with a second user, and the system may be further configured to communicate a second web service message to the one or more second web services, using second existing communication session information corresponding to the second user, concurrently with communicating the first message.

In one embodiment, the service resource locator may comprise a Uniform Resource Locator ("URL") associated with the one or more services. In one embodiment, the web service environment information, the request information, or a combination thereof may comprise a client reference identifier, a service resource locator, and security credentials associated with a user, and the processor may be further configured to combine the client reference identifier, the service resource locator, and the security credentials associated with the user to produce the session identifier.

In one embodiment, the security credentials may include endorser credentials associated with the user, and the endorser credentials are generated by a security endorser.

In one embodiment, the web service environment information may include a service resource locator and security credentials associated with a user, and the processor may be further configured to combine the service resource locator and the security credentials associated with the user to produce the session identifier.

In one embodiment, to determine the session identifier, the processor may be configured to receive a client sharing mode indicator that specifies a degree of session sharing to be used in communicating messages to the one or more services, wherein the session identifier is determined based upon the client sharing mode indicator.

In one embodiment, the processor may be further configured to determine a secret key value; create new session information comprising the secret key value and a secret key identifier associated with the secret key value; and create an association in the session table between the session identifier, the secret key value, and the secret key identifier, wherein the secret key value and the secret key identifier are retrievable from the session table based upon the session identifier.

Embodiments of the present invention provide a non-transitory machine-readable medium for a computer system, the non-transitory machine-readable medium having stored thereon a series of instructions executable by a processor, the series of instructions comprising instructions that cause the processor to receive, at a first web service application, a first request to send a first web service message to a second web service application or group of web services; instructions that cause the processor to retrieve first existing communication session information having the same sharing characteristics as the first request, wherein the sharing characteristics of the first request comprise environment information associated with the first web service application and request information associated with the first request; and instructions that cause the processor to communicate the first web service message to the second application or group of web services using the first existing communication session information.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Techniques are disclosed for sharing communication session information sharing in web service applications. The techniques include management of concurrent sessions by dynamically determining the session association of web service requests at runtime. These sessions can be shared by a group of web services on the server side, and across multiple web services clients with many users, independently of where these applications reside. Session identifiers are determined for these concurrent web service invocations based on an algorithm that uses information from configuration and runtime data. Different information is used in the session identifier depending on configuration parameters to provide different types of sharing that correspond to different use cases. This mechanism can be used with SOAP-based web services, REST-based web services, and the like.

In the case of SOAP based web services, the techniques disclosed herein can be used when a client application is protected by a WS-SecurityPolicy with WS-SecureConversation. When the request reaches the client security agent, the agent should either perform the handshake for a request thus establishing a new secure conversation session (for which a session does not exists already), or associate the request to a particular session, since multiple concurrent sessions may exist already. This association is established by determining a session identifier based on information such as user and endorser credentials, a service group identifier, and a policy subject unique resource pattern. The user and endorser credentials are calculated depending on a security policy that indicates which authentication token (such as SAML, Kerberos, X509 or Username) is being used, and what endorser is being used, if one is being used. The service group (a set of web services configured to share a session) is determined from the advertised WSDL of the service.

Figure 1:
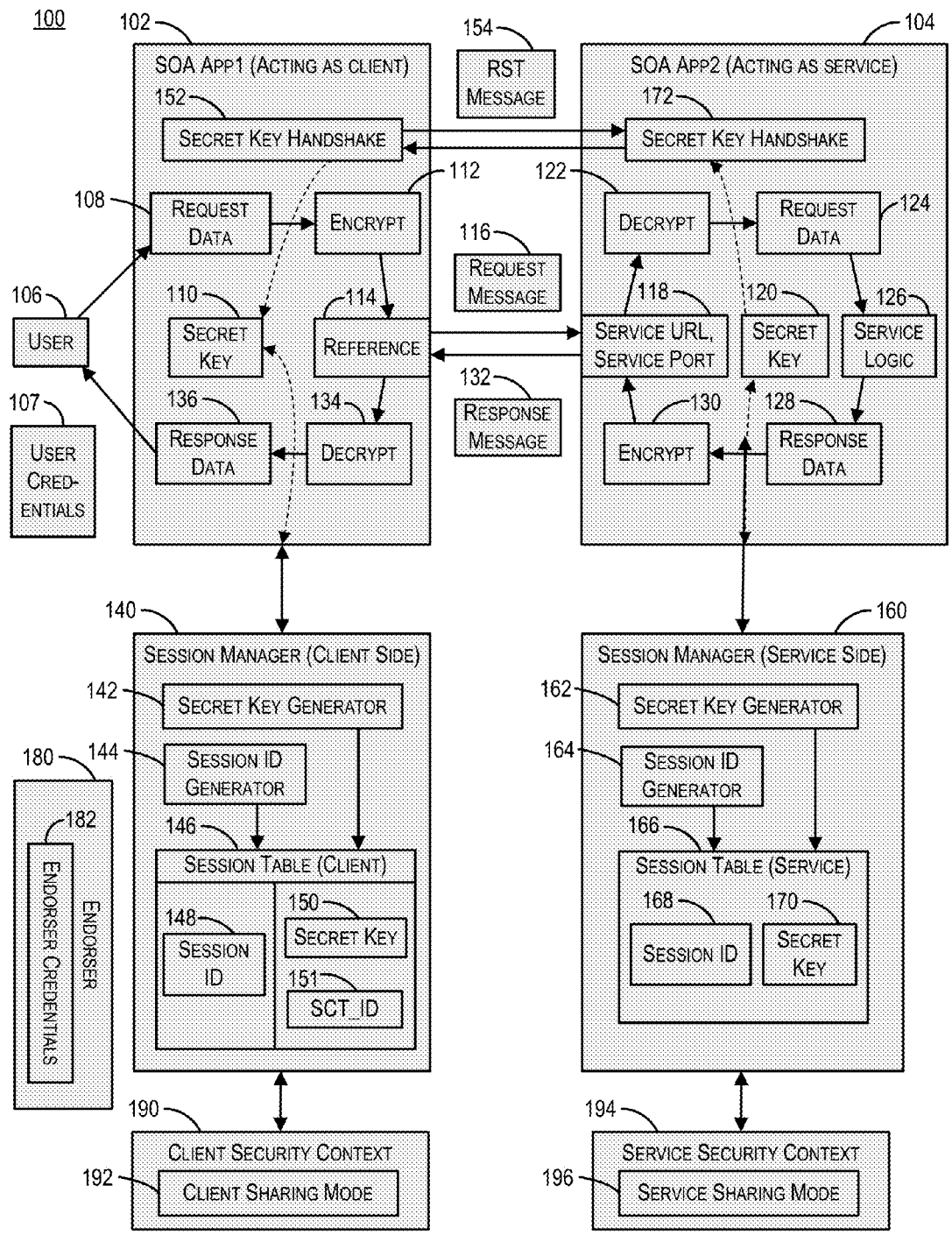
FIG. 1 is an illustrative drawing of secure communication system in accordance with an embodiment of the present invention.

FIG. 1 is an illustrative drawing of a secure communication system 100 in accordance with an embodiment of the present invention. The system 100 facilitates secure communication between web service applications 102, 104. The secure communication system 100 may be implemented in a service-oriented architecture (SOA) environment, e.g., Oracle® Web Service Manager (OWSM) included in Oracle Fusion Middleware, or the like. Secure communication refers to, in one aspect, sending and delivery of messages between a SOA application 102 acting as a client and another SOA application 104 acting as a web service using communication protocols that protect the contents of the messages from being read by unauthorized users who may receive the messages. Secure communication can use encryption, for example, at the client to encrypt messages that are sent to the web service, and decryption, at the receiving web service, to decode the message. The encryption and decryption operations use an encryption key, i.e., a secret data value that is known to both the client and the web service, but not to unauthorized users.

The system 100 supports secure conversations such as those specified by the WS-Secure Conversation OASIS specification, which enables secure messaging between a client and a web service, and is particularly useful when the client and web service exchange multiple messages. Secure conversations can provide performance improvements because asymmetric (e.g., public key/private key) encryption operations are expensive, and in the absence of a secure conversation, each request secured with a security policy using WS-Security involves an asymmetric encryption/decryption operation. In a secure conversation, a client and a web service use a "security context" which can be understood as security-related state data associated with a conversation or session that includes one or more messages sent between a client 102 and a web service 104. For example, a security context may be represented by data that resides on the client for use in communicating with the web service, and also by related data that resides on the server for communicating with the client. The WS-Secure Conversation specification provides a "handshake" process that allows a web service 104 and its client 102 to authenticate to each other and to establish a shared security context, which is shared for the lifetime of the communication session. The security context contains a shared secret key, which is also referred to as a security token. The secret key is stored as a secret key 110 on the client side and as a secret key 120 on the web service side of the conversation. The secret key 110 is, for example, an encryption key for use in a symmetric encryption algorithm such as the Advanced Encryption Standard (AES), Blowfish, RC4, or the like. Once the secret key 110 is known to both the client 102 and the web service 104, the secret key can be used to secure messages 116, 132 sent between the client 102 and service 104. In one example, the secret key 120 is created on the server side, and communicated to the client side. Since the secret key 170 is a symmetric key, data sent between the client 102 and the web service 104 can be encrypted and decrypted efficiently.

In one embodiment, Web services operations involve clients 102 invoking operations, in response to receiving request data 108 in requests, by sending request messages 116 to services 104. The services 104 perform the requested operations and send the results 128 back to the clients in response messages 132. The clients 102 communicate the messages 116 to the service 104 and receive the responses 132 from the service using information in communications sessions, such as secret keys 110, 120 for encryption and decryption of request and response messages.

Communication sessions, e.g., secret keys and other communication-related data, can be created and discarded for each request from a client to a service, and for each response from a service to a client. However, creating communication sessions can be time-consuming, so, in embodiments of the invention, sessions are shared, i.e., re-used, by re-using the session data for additional requests on the client side and/or for additional responses on the server side. Session sharing can substantially increase system performance by allowing requests and responses to be sent and received without waiting for creation of new sessions and session-related data. For example, web service interactions can be encrypted to provide data security. The encryption and decryption operations involved in such secure communication use secret keys 110, which are ordinarily generated and/or exchanged frequently, e.g., for each request. In one or more embodiments, session sharing enables reuse of the secret keys for subsequent requests and replies among the same or related entities, e.g., for subsequent requests by the same user 106 having the same user credentials 107 between the same client 102 and service 104, or by different clients to the same service, and so on.

In accordance with embodiments of the invention, sessions can be shared in at least the following types of web service interactions: (1) a single client invoking a single web service, in which case a single session is re-used for multiple invocations by the same user (i.e., user credentials 107, which are used to distinguish different users); (2) multiple clients invoking a single web service port, in which case a single session is re-used for multiple invocations by the same user with the same user credentials 107 from the same or different clients; and (3) multiple clients invoking a group of web services, in which case a single session is re-used for multiple invocations by the same user and user credentials 107 from the same or different clients. The aforementioned sharing modes are per-user (i.e., per user credential), that is, not shared among different users. Since sessions are not shared by different users in those modes, each user can be authenticated once for each session, and the session can remain in existence as long as the authentication credentials remain valid. A second set of client sharing modes is provided to allow client sessions to be shared among different users by re-authenticating each user for each invocation. Although authentication operations are relatively time-consuming, there can still be a performance benefit in sharing session data such as secret keys for protecting request and response messages. Each client is identified by a client reference ID value 114 in the single client mode (1). Services are represented by service URL's 118, and groups of services are represented by service group identifiers (ID's). Users are represented by user credentials 107, and endorsers are represented by endorser credentials 182. Two users are considered to be different if they have different user credentials 107, and two clients are considered to be the same if they have the same user credentials. In each client sharing mode, if endorser credentials are present, then a different client session will be created for each different endorser credential. If both user credentials and endorser credentials are present, then a different session will be created for each unique combination of user credentials and endorser credentials.

Sessions can also be shared on the web service side 104 of interactions, e.g., on servers that provide web services 104. There is a "per-port" service sharing mode, in which each service port has a different session that can be shared for communication to one or more clients interacting with that service as long as the clients have the same secret key. There is also a "per-service" sharing mode, in which sessions can be shared among services that are in a service group. In the per-service sharing mode, each service group has a different session, which can be shared for communication to one or more clients interacting with any of the services in the service group as long as the clients have the same secret key. The secret key is identified by an SCT_ID value 151.

In one or more embodiments of the invention, the aforementioned session sharing modes are provided by the session managers 140, 160, which determine the session ID that is used to select the session to be used for each request message 116 and response message 132. Since sessions are selected based upon the session ID value, a session will be shared, i.e., reused in each request (or reply, on the service side) that maps to the same session ID. Thus, the session sharing that occurs is based upon the results produced by the session ID generators 144, 164. The session ID's are generated based on different entities in the SOA environment for different sharing modes, with client-side session ID's being based upon the service URL, user credential, and/or endorser credential for sessions that can be shared across multiple clients and used with a single service by a single user and/or endorser. A session that is not to be shared across clients has a session ID 148 based further upon the client reference identifier 114 to which the session is to be restricted (though the session can still be shared across multiple invocations by a user). A client-side session that is to be sharable across a group of services has a session ID 148 based upon a service group identifier instead of a service URL. A client side-session that is to be sharable by multiple users has a session ID 148 that is not based upon the user credentials, but is still based on the endorser credentials, and the user credentials will be authenticated for each request that uses the session. Service-side session ID's 168 are generated based upon the service's port identifier and the security identifier (SCT_ID) of the secret key associated with the session for sessions that are not to be shared across multiple services 104. For sessions that are to be shared across multiple services 104, the services that are to share the session are members of a service group, and the service-side session ID's are generated based upon the service group's identifier and the SCT_ID 151 of the secret key 150 associated with the session. These mappings of entity information to session ID's are summarized in Table 1 below. Note that the client sharing modes that do not re-authenticate are referred to as modes 1(a), 2(a), and 3(a), and the client sharing modes that do re-authenticate are referred to as modes 1(b), 2(b), and 3(b).

TABLE 1

| Client Sharing Mode | (a) Per-user sessions (no re-authentication) | (b) Sessions shareable among users (with re-authentication) |
|---|---|---|
| 1. Per-user session reuse with no sharing among applications | Session ID = client reference id + service URL + endorser credential + user credential | Session ID = client reference id + service URL + endorser credential |
| 2. Shared from multiple clients to single service port | Session ID = service URL + endorser credential + user credential | Session ID = service URL + endorser credential |
| 3. Shared from multiple clients to group of services | Session ID = service group id + endorser credential + user credential | Session ID = service group id + endorser credential |

In one embodiment, as introduced above, sessions can be shared on the service side 104 of web service interactions. Service-side sharing modes are provided for re-using sessions in service applications as shown in Table 2 below. The service-side session ID generator 164 implements these modes by generating a session ID 168 as described in more detail in FIG. 8. The service-side session manager 160 uses the generated session ID 168 as a lookup key to check if there is a secret key 170 associated with the session ID 168 in the session table 166. If there is a secret key 170 associated with the session ID 168 in the session table 166, then the existing session (indicated by the secret key, and possibly including other information in addition to the secret key) is re-used; if not, then a new session and secret key are created, and the secret key is stored in the session table 166 in association with the session ID 168. The service-side session manager 160 can then communicate the newly-created secret key 170 to the client-side session manager 140, which can store the secret key 170 in the client-side session table 146 as secret key 150 in association with session ID 148. The service-side sharing modes are referred to as service sharing modes 1 and 2 as shown in Table 2 below.

TABLE 2

| Service Sharing Mode | Description |
|---|---|
| 1. Shared to a single service port | Each service port has a different session, which can be shared for communication to one or more clients interacting with that service as long as the clients have the same secret key. Re-use session for communication with one or more clients from a particular service port if the same secret key is used in each communication. A separate session (with separate encryption keys) is created for each communication to a client from a different service port and/or using a different secret key (compared to any existing communication session in the service application). |
| 2. Shared among a group of services | Each group of services has a different session, which can be shared for communication to one or more clients interacting with that group of services as long as the clients have the same secret key. |

In Table 2, two secret keys are different if they have different SCT_ID values, and the same if they have the same SCT_ID value.

In one set of embodiments for the "no sharing" cases (1), in the case of a J2EE (Java 2 Enterprise Edition) client, the sessions are per reference. In the case of SOA (Service Oriented Architecture), the sessions are per SCA reference. The reference resource pattern can be used to associate a reference to a session. For SOA, in some cases, a new dispatcher is created for every invocation of the request of a particular reference calling a particular service. This approach is effective because these requests belong to the same reference, so they are part of the same session even though a new dispatcher instance might be created. On the service side, since the session is per port, and the port resource pattern can be used to associate a port to a session.

For the "sharing" cases (i.e., modes 2 and 3), the client sessions can be shared across applications, or across references in the same application 102. These sessions can be created against a particular service URL (sharing mode 2 described above) or against a group of services (sharing mode 3 described above). Note that the first sharing mode (1), "No Sharing" is a special case of the second sharing mode (2) where the reference group contains one reference rather than multiple references.

The "no sharing" cases can be useful for systems or deployments in which different clients can share the same secret, e.g., because the clients have the same credentials. The same credentials might be used by two different applications. Even though the applications are sharing the same credentials, they are still different applications, which have different client reference identifiers, and should not be treated as the same client. Therefore they should not share session information.

The "sharing" cases (i.e., 2 and 3) can involve configuration settings on the client and/or service sides. For sharing modes b, no configuration is required on the service side. However, the client side may need configuration to indicate sharing modes b. For sharing modes c, in which sharing is done among multiple reference groups and multiple service groups, both the client and service sides may need configuration. On the service side, the service groups may need to be defined. Similarly, the client side may need to define reference groups based on service groups. Since there is no established standard for a client to have knowledge of service session grouping, the client can determine the service sharing groups out-of-band and configure accordingly. The system 100 may also support advertising the service groups for secure conversation in the WSDL, such as by including the service groups as part of an identity, in which case the client need not have local configuration.

The configuration of the service groups can be done globally by an administrator, who can define the groups and the members of those groups. Another approach is to allow services to specify which group they belong to using configuration overrides to the policy attached to them. For example, if the service A and service B belong to a group "sessionGroupAB", then both the service A and service B policies may have configuration overrides with the value "sessionGroupAB". At runtime, the session manager 160 will retrieve this configuration override value when these services are invoked, and create a session identifier based on this group identifier. The client side can use similar configuration overrides for the policies of the references which communicate to these service groups. The client side can use the same value such as "sessionGroupAB" or a different value for session groups. The applications may need permission grants to be part of a particular group so that they can join a particular secure conversation session. Also, at deployment time, validation can be done to see if these services can be grouped together to share a secure conversation session. For example, rules can be defined to allow only services or references having security policies with the same security level to be in the same group.

In one or more embodiments, services having equivalent bootstrap polices are associated with a service group. This grouping can be automated and users can choose this automatic grouping instead of defining and customizing their own service groups. As described herein, the system 100 provides session sharing, where the sessions can be shared between different services/applications across servers in the same domain or across servers in different domains. Therefore, the sessions are available for sharing across multiple server instances running in separate processes (e.g., in separate Java Virtual Machines).

As an example, consider a server-side session table 166 that has the following contents for a service port identifier "ServicePort1", a secret key identifier "SCT_ID1", and a secret key "SecretKey1".

| Session ID | Secret Key |
|---|---|
| ServicePort1 + SCC_ID1 | SecretKey1 |

Referring to FIG. 1, in one embodiment, a web service invocation begins when a user 106 interacts with a first SOA application 102, thereby causing the SOA application to invoke a web service operation of a second SOA application 104. The operation may be, for example, any operation provided by a web service, such as a bank balance inquiry or transaction for a web service that performs banking and finance operations, or any other operation that can receive input data and/or produce output data. The first application thus acts as a client 102, and the second application acts as a web service 104. The user 106 provides user credentials 107, which establish the identity of the user 106, to the client 102. The user credentials 107 can be, for example, a user name and password, or SAML credentials, or any other type of data for authenticating the identity of a user. The user credentials 107 can be supplemented or replaced by endorser credentials 182 provided by an endorser 180, e.g., an entity such as an endorser service that uses a private key to sign credential information. If an entity such as a client or web service trusts the endorser 180 but not the user credentials 107, then the endorser credentials 182 can be used to establish the identity of the user to that entity.

In one embodiment, to invoke the web service operation on behalf of the user 106, the client 102 creates request data 108, which represents the operation and can include input data to be used by the operation. An encrypt module 112 encrypts the request data 108 with a secret key 110 using a symmetric encryption technique such as AES, Blowfish, RC4, or the like. The client 102 gets the secret key 110 from a session manager 140, which stores the sessions that represent data used in secure conversations between the client 102 and the server 104. A session may be used for a single communication and discarded, or, as described herein, re-used for multiple communications, e.g., to improve performance and reduce resource usage. The session manager 140 is, for example, located on the same computer system as the client application 102, so that the client application 102 can access the session manager 140 using relatively fast operations such as local procedure calls and local memory accesses. The session manager 140 can be located on a different computer system, e.g., at a central session manager server, in other embodiments. Some or all of the security-related data associated with a secure conversation can be included in a client security context 190 on the client side and a service security context 194 on the service side. In one embodiment, the secret key 110 and the session table 146 are stored in the client security context 190 and the server security context 194. Security context information generated by the service 104, such as the secret key 170, is therefore sent from the service 104 to the client 102 and vice-versa via a computer network (or other form of communication if the client 102 and server 104 are located on the same computer system). Once the security context information is available locally (i.e., in the memory of the computer system(s) executing the client 102 and web service 104), the information stored in the contexts 190, 194, such as the secret key, can be accessed quickly.

In one embodiment, in preparation for encrypting the request data 108, the session manager 140 uses a session ID generator 144 to generate a session ID 148 as described below with reference to FIGS. 7 and 9. The session ID 148 is used as a lookup key to determine if there is a secret key 150 associated with the session ID 148 in the session table 146. If there is no entry in the session table 146 with the particular session ID 148, then the client 102 and server 104 exchange data to establish the client security context 190 and the server security context 194. For example, if there is no entry in the session table 146 for the determined session ID, a new secret key 150 is generated, either by a secret key generator 162 on the web service side, or by a secret key generator 142 on the client side, and stored in the session table. In either case, the new secret key is communicated to the other side of the conversation, i.e., to the client 102 or to the web service 104.

In one example, the client application 102 sends a bootstrap request (RST) to the service application 104 to request a secret key 150. The secret key 150 is generated on the web service side by a service-side session manager 160. In this example, the key generation process is initiated by the client 102, which uses a client side secret key handshake module 152 to send a Request Secret Token (RST) message 154 to the service 104 to request a new session ID. A secret key handshake module 172 at the service 104 receives the RST message 154, and uses the secret key generator 162 to generate a new secret key 170. The new secret key 170 is stored in the session table 166 on the web service side in association with a session ID 168 generated by the service-side session ID generator 164. The service-side session ID 166 is based on a combination (e.g., concatenation, hash, digital signature, or other function) of a service port identifier 118 (or a service group identifier, as described elsewhere herein) and a secret key identifier (SCT_ID) that identifies the secret key, so that a distinct secret key is ordinarily created and stored for each distinct service port (or group). The secret key is thus identified by an associated SCT_ID, and can be subsequently retrieved from the session table 166 using the SCT_ID in combination with the service port (or service group) identifier of a particular web service 104.

The new secret key 170 is then sent back to the client session manager 140, e.g., in an RST Response (RSTR) message (not shown) by the secret key handshake module 172. A security identifier (SCT_ID) that corresponds to the secret key 170 is included in the RSTR message (not shown) that is sent back to the client 102 in response to the RST message 154.

On the client side, the client application 102 uses the secret key handshake module 152 to receive and store the secret key and its identifier (SCT_ID) in the session table 146 as the secret key 150 and SCT_ID 151 in association with the session ID 148 generated by the session ID generator 144. The client 102 can subsequently retrieve the secret key 150 and SCT_ID 151 from the session table 146 (using the session ID 148 as a lookup key) for communication with the web service 104. The client 102 can encrypt request messages 116 with the secret key 150 and send the secret key identifier (SCT_ID) 151 corresponding to the secret key in plaintext in the request messages 116, so that the web service 104 can generate the service-side session ID 168 and look up the secret key 170 using the service-side session manager 160, as described in more detail below. The client-side session table 146 can contain entries such as that shown in the following example for a session having a session ID based on a client reference "Ref1", a service URL "Service1URL", and a user credential "user1_credential". The secret key is represented as "SecretKey1" and the secret key ID (SCT_ID) is represented as SCT_ID1.

| Session ID | Secret Key | Secret Key ID (SCT_ID) |
| --- | --- | --- |
| Ref1 + Service1 URL + user1_credential | SecretKey1 | SCT_ID1 |

Once the secret key 150 has been stored in the session table 146 in association with the session ID 148 generated by the session ID generator 144, the session manager 140 returns the newly generated secret key 150 to the client 102 for use as the secret key 110. Otherwise, if there is already a secret key 150 associated with the given session ID 148 in the session table 146, then there is no need to create a new secret key, and the existing secret key 150 is returned to the client 102 as the secret key 110 to be used for encryption. In one aspect, the secret key 150 can remain stored in the session table 146 for a period of time, and be reused by multiple requests and responses. An expiration time (not shown) can be associated with the secret key 150, so that the session manger 140 re-generates a new key 150 periodically, e.g., every 24 hours, every 12 hours, or the like, to reduce the risk of the secret key being compromised.

The client 102 then proceeds to encrypt and send the request data 108 to the service 104. The encrypt module 112 encrypts the request data 108 using the secret key 110. The encrypted request data is sent from the client 102 (which corresponds to the SOA reference 114) via a networking protocol such as Simple Object Access Protocol ("SOAP") or the like in a request message 116 to the web service 104 in one embodiment, or via in-memory communication in another embodiment in which the client 102 and service 104 are located on the same computer system and can both access a common shared memory area (not shown). The destination of the request message 116 is identified by a SOA service URL and a service port 118 associated with the web service 104. Upon receiving the message 116, the web service 104 uses a service-side session manager 160 to retrieve a secret key 170 from the server-side session table 166. The service-side session manager 160 is, for example, located on the same computer system as the service 104, so that the service 104 can access the session manager 160 using relatively fast operations such as local procedure calls and local memory accesses. The secret key 170 will ordinarily already be present in the session table 166, since the client 102 should have previously caused the server-side secret key 170 to be generated, e.g., by requesting that the service 104 generate the secret key 170 and send the key back to the client 102. The service side session manager 160 would have stored the secret key 170 in the service side session table 168 using the secret key 170 as a lookup key.

The server side session manager 160 uses the service side session ID generator 164 to generate a session ID 168. The service side session ID can be generated using the process shown in FIG. 8 below. The session ID 168 is used to look up sessions in the service side session table 166. The session ID 168 controls whether sessions are shared, i.e., re-used. In one embodiment, the session ID 168 is generated for each received request message 116 based upon information in the message 116 such as a secret key ID (i.e., SCT_ID) and the service port 118 or group that received the message 116. Service-side sharing modes are provided, and one of the sharing modes can be selected and used in each web service invocation (e.g., for each request message received). Thus the service-side sessions can be shared according to different criteria for different interaction scenarios. For example, on the service side, a 'single service port" sharing mode causes sessions to be re-used unless they have different service ports or secret keys, and a "service group" sharing mode causes sessions to be re-used unless they are associated with different service groups or secret keys.

In one aspect, sharing occurs when two or more distinct request messages 116 and data in the web service environment map to the same session ID 168, since the same session information, e.g., secret key 170, will be used for both request messages 116. The generation of session ID's by the service side session ID generator 164 is described in more detail below, e.g., with reference to FIG. 8. When the service session manager 104 generates the secret key 170, an identifier (SCT_ID) that corresponds to the secret key 170 is sent to the client 102, which stores the SCT_ID in a client-side session table with the secret key, in association with a client-side session ID 148, as described below.

The client 102 stores the secret key identifier (SCT_ID) in the client-side session table 146, e.g., as part of the secret key 150 data, and in association with the session ID 148 (i.e., a lookup key). The client 102 generates the session ID 148 (lookup key) based upon attributes of the client, attributes of the service URL and port 118, and credentials of the user and/or endorser, depending on the sharing mode, as described elsewhere herein. Storing the SCT_ID in the client-side session table 146 enables the client to send the SCT_ID sends the security identifier (SCT_ID) to the service 104 as part of the request message 106. The service-side session manager 160 can then generate the service-side session ID 168 based on the service port 118 and the SCT_ID received in the request message. That is, the service 104 uses a combination of the service port 118 and the SCT_ID to generate the session ID 168, and retrieves the secret key 170 from the session table 166 using the session ID 168 as a lookup key.

The secret key 170 received from the session manager 160 is then used by decrypt module 122 to decrypt the data received in the request message 116, thereby forming decrypted request data 124. The decrypted request data is passed to service logic 126, e.g., computer program code that implements the web service operation, which performs the operation provided by the web service (e.g., checking a bank balance, or any other operation defined by the web service 104). The decrypted request data 124 is provided to the service logic 126 as input data. The service logic 126 executes and produces response data 128 as output. Note that either the request data 124 or the response data 128 may be omitted, e.g., if the operation does not receive any input, or produce any output, respectively. An encrypt module 130 encrypts the response data 128 using the secret key 120, and the resulting encrypted response data is sent to the client 102 as a response message 132 using a communication protocol such as SOAP, or the like in one embodiment, or in-memory in another embodiment in which the client 102 and service 104 are located on the same computer system and can both access a common shared memory area (not shown). The destination of the response message 132 is identified by a SOA reference 114 associated with the client 102. Upon receiving the response message 132, the client 102 extracts the encrypted response data from the message 132. A decrypt module 132 decrypts the encrypted response data using a secret key 110 provided by the session manager 140. The client 102 then returns the decrypted response data 136, which represents the results of the web service operation, to the user 106.

In one set of embodiments, the values for user credentials and endorser credentials in session identifiers vary based on the policy. Table 3 below lists the combinations per supported policy.

TABLE 3

| Policy | Client (re-auth = false) | Client (re-auth = true) |
|---|---|---|
| Wss11 Use cases ||| 
| username_token_with_ message_protection | user_credential = digest (username + password) endorser_credential = null | endorser_credential = null |
| saml_token_with_message_ protection | user_credential = digest (username) endorser_credential = digest (private key + certificate) | endorser_credential = digest (client cert + private key) |
| x509_token_with_message_ protection | user_credential = digest (private key + certificate) endorser_credential = null | endorser_credential = null |
| wss11_message_protection | user_credential = null endorser_credential = null | endorser_credential = null |
| kerberos_token_with_ message_protection | user_credential = digest (TGT) endorser_credential + null | endorser_credential = null |
| sts_issued_saml_hok_with_ message_protection | user_credentials = digest(username + password((STS_AUTH_USER_ CSF_KEY) Or privatekey + cert(STS_AUTH_ X509_CSF_KEY) Or TGT(STS_AUTH_CALLER_ PRINCIPAL_NAME)) endorser_credential = null | endorser_credential = null |
| On Behalf of with wss11_sts_issued_saml_hok | user_credentials = digest(username and/or password) STS_AUTH_ON_BEHALF_OF_ CSF_KEY or subject) endorser_credentials = digest (username + password((STS_AUTH_ USER_CSF_KEY) Or privatekey + cert(STS_AUTH_ X509_CSF_KEY) Or TGT(STS_AUTH_CALLER_ PRINCIPAL_NAME)) | endorser_credential = digest(username + password ((STS_AUTH_USER CSF_KEY) Or privatekey + cert(STS_ AUTH_X509_CSF_KEY) Or TGT(STS_AUTH CALLER_PRINCIPAL_ NAME)) |
| Wss10 Use cases ||| 
| username_token_with_ message_protection | user_credential = digest (username + password + private key + cert) endorser_credential = null | endorser_credential = null |
| saml_token_with_message _protection | user_credential = digest (username) | endorser_credential = digest (private key + certificate) |

TABLE 3-continued

| Policy | Client (re-auth = false) | Client (re-auth = true) |
| --- | --- | --- |
| x509_token_with_message_protection | endorser_credential = digest (private key + certificate) user_credential = digest (private key + certificate) endorser_credential = null | endorser_credential = null |
| wss10_message_protection | user_credential = digest (private key + certificate) endorser_credential = null | endorser_credential = null |

In one or more embodiments, for a token issued by a Secure Token Service (STS), the user credentials which determine the session ID are the original credentials which are used to authenticate to the STS. These credentials can be the username+password credentials corresponding to STS_AUTH_USER_CSF_KEY. These credentials can alternatively be private key+certificate corresponding to STS_AUTH_X509_CSF_KEY. These credentials can alternatively be TGT corresponding to STS_AUTH_CALLER_PRINCIPAL_NAME. The knowledge of credentials for a particular policy is ordinarily in the policy executor. Therefore the executor corresponding to the client STS policy is cached in the secure conversation STS executor, which is then used to determine session ID.

In the case of re-authentication=true, on the server side, the endorser credential (client certificate) from the bootstrap is cached in the session object for the Wss11 SAML SV with message protection. In each application request message, the client credential is retrieved from the session and is used to validate the SAML SV assertion (DN check) protected by the security context token. Thus, although user credentials are not used in the session identifier in the re-authentication=true cases, endorser credentials are still used in cases such as SAML SV, in which a SAML token is provided by the client to the service. The client endorser uses its private key. The endorser is associated with the client. The server trusts the client. The client asserts that it trusts the user by creating the SAML SV token. Different endorsers do not share the same session because at the time of the first request, the endorser is authenticated, but the user is not. The endorser is still used with message protection. When the service receives each message, the user is re-authenticated, but the message is not verified, because the message is "signed' or encrypted by the secret key. In some use cases, the session identifier is based only on the endorser credential. That means, for example, that if there is another client with a different endorser with a different private key, and the same user, that user does not share the session because the endorsers are different. Different endorsers do not share sessions because at the time of the first request, the endorser is authenticated, but the user is not. Different endorsers produce different SCT_IDs in messages, so different sessions will be used for different endorsers as appropriate. In modes that do not use the reference identifier, if two clients share the same endorser, then they can share the same session.

In one or more embodiments, communication sessions, e.g., session information such as encryption keys, are shared or re-used by the second and subsequent messages sent for the same session identifier, at least until such time as the session information or identifier expires. Multiple requests from the same client (e.g., the same reference identifier) to the same service will share the same session information, so that, for example, encryption keys can be re-used, instead of generating new encryption keys for each request. In the implementation of a client, a "proxy" object may be created to represent each invocation if session sharing is not used. With session sharing, these proxy objects can be shared and accessed concurrently, thereby reducing the amount of memory used and eliminating the computational overhead involved in creating a proxy for each request.

Sharing of sessions, as described herein, involves sharing communication session information such as the secret keys 150 on the client side (and the secret keys 170 on the service side), across multiple web service interactions, e.g., across multiple invocations of a web service by a client, or across multiple responses sent by a service to a client. A session, e.g., the session information used in a web service invocation, can be used concurrently across multiple invocations. Although some synchronization may be performed when multiple threads or processes attempt to simultaneously access a session table 146, 166, such accesses are relatively quick, and once the session table has been accessed by a thread or process, the thread or process can continue to execute concurrently with other threads or processes to perform operations such as generating session identifiers and secret keys, and communicating via a network simultaneously, or nearly simultaneously (subject to time slicing) with the other threads or processes. In one aspect, multiple simultaneous invocation requests can be made by corresponding multiple users, and the sessions and related information (e.g., web service security contexts) that correspond to those invocation requests can be used concurrently by multiple users.

For example, when multiple users request web service invocations and re-authentication is disabled (re-auth=false), a distinct session will be assigned to each distinct user. If a particular user requests multiple invocations that have the same sharing characteristics, e.g., the same session identifier, then the same session can be used for each invocation by that user, including concurrent invocations that overlap in time, subject to any synchronization operations that may temporarily block one or more of the concurrent threads or processes (e.g., as needed to access or modify shared data structures such as the session table 146).

When multiple users request web service invocations and re-authentication is enabled (re-auth=true), then multiple distinct users can share the same session, as long as the users have the same sharing characteristics. Thus, concurrent invocations can be performed using a single shared session in response to concurrent requests by multiple users, subject to any synchronization operations that may temporarily block one or more of the concurrent threads of processes. When re-authentication is enabled, if multiple users request multiple invocations that have the same sharing characteristics, then the same session can be used for each invocation by any of the users. The user credentials will be re-authenticated for each request, but the data protection operations using the secret keys 150, 170 will still benefit from sharing session information such as the secret keys (so that new encryption keys need not be regenerated for each request).

In one aspect, there is a tradeoff between using and not using re-authentication. When re-authentication is disabled, a distinct session is created for each user. There is overhead for creating each session (e.g., entry in the session table 146) in terms of time to create and delete the entry and the storage to represent the entry, but efficiency is gained because there is no need to re-authenticate the user for each request. That is, without re-authentication, a communications session is established, used once, and deleted. In use cases with thousands of users, thousands of sessions would be created. Without re-authentication, the shared sessions are authentication and message protection sessions. This configuration is beneficial for use cases with many invocations of the same service, since the cost of establishing a session can be amortized over multiple invocations Conversely, when re-authentication is enabled, there is less overhead for creating and storing sessions when there are multiple users, because sessions can be shared by multiple users, but there is greater overhead for each web service invocation, because each user is re-authenticated in each invocation. Thus, re-authentication scales well with the number of users, since a session can be used for any number of users. With re-authentication enabled, the sessions provide message protection but are not authentication sessions in the sense of providing for repeated communication with a single authentication operation. Re-authenticated sessions provide a performance benefit because the re-authentication for each message is less expensive than asymmetric encryption operations that would otherwise be used to perform message protection between a client and service. Therefore, the decision to use re-authentication can be based on how many users are in the system, and how long each user is expected to stay, i.e., use the system. A system with a small number of users who stay in the system for long periods of time is not a good candidate for using re-authentication. A system with many users that use the system for short periods of time is a good candidate for using re-authentication. SOA systems, for example, are ordinarily good candidates for re-authentication.

In one embodiment re-authentication can be enabled or disabled by placing an attribute with a name such as "re-auth" in a security policy. If re-auth is true, then the service expects to receive the credentials of the end user. If re-auth is false, then the end-user credentials are not expected and are ignored.

Figure 2A:
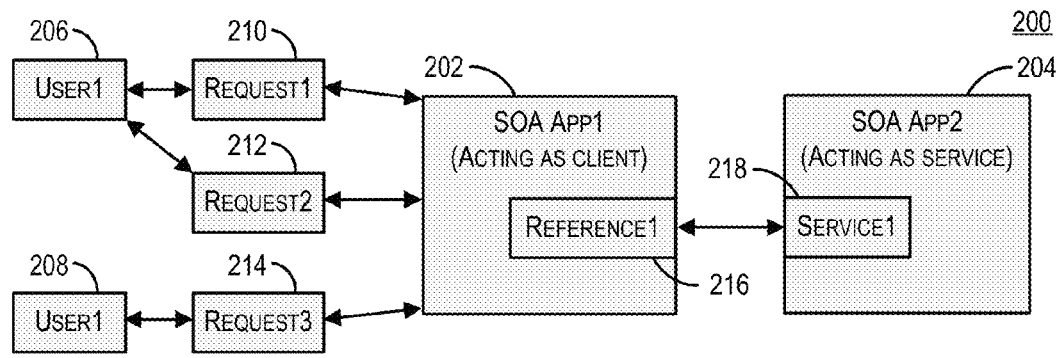
FIG. 2A is an illustrative drawing of per-user session reuse with no sharing among applications, in accordance with embodiments of the invention.

FIG. 2A is an illustrative drawing of per-user session reuse with no sharing among applications, in accordance with embodiments of the invention. A session can be shared among web service invocations from one client to one service by one user (mode 1a) or by multiple users (mode 1b) as shown in FIG. 2A. In this example, a first user 201 requests a first web service operation 210 at a client 202, which is associated with a SOA reference 216. A SOA reference is, for example, a logic identifier of the client. A reference identifier can be a hierarchical name, e.g., Domain/Server/Application/Service/Module/Port. The client 202 has a session table 146 that is initially empty. Upon receiving the request 210 from the first user 206, the client 202 generates a session ID 148 based on the reference ID, server URL, and, in mode 1a, the user credential. The client 202 then checks the session table 146 for an entry having the generated session ID 148. The client-generated session ID 148 may be, for example, the reference ID concatenated with the server URL and a hash code based on the user credential. No entry is found, so the client sends a request (e.g., RST message 154) containing authentication credentials of the first user to a service URL and service port 218 of the web service 204 to create a new session. (The client may include a null security key identifier (SCT_ID) value in the request message, or omit the SCT_ID value from the request message, since there is no secret key 150 yet.) The service 204 receives the request for a new session at the service port 218 and checks the authentication credentials in the request message. For example, if the authentication credentials 107 are a user name and a password, the service checks the user name and password with an appropriate password database. If the credentials 107 are SAML credentials, the service verifies the credentials using the appropriate SAML verification process. If the authentication fails, the service returns an error and the operation fails. Otherwise, if the authentication is successful, the service creates a new secure conversation session, which includes a service-side secret key 170 and a security identifier (SCT_ID) that corresponds to the secret key.

The service-side session ID 170 in the example of FIG. 2A is generated using service-side sharing mode 1, since there is a single service 204 in FIG. 2A. The service 204 thus generates the service-side session ID based on the service port 218 and the SCT_ID extracted from the message (e.g., service port ID+SCT_ID). The service 204 uses the session ID 168 as a lookup key for the secret key 170 in a service-side session table 166 (e.g., a lookup table in the memory of the computer system on which the service is executing). There is no entry in the session lookup table 166 with that lookup key, since this invocation is the first one for this particular service port ID and SCT_ID. The session manager 160 then stores the secret key 170 in the session table 166 in association with the session ID 168, so that subsequent queries of the session table with that session ID as a lookup key will return the secret key 170. The service 204 then sends a response (RSTR message) to the client 202. The service can then initiate a key exchange protocol (e.g., based upon a public key/private key technique) to send the secret key 170 to the client 202. The client 202 receives the secret key and stores it in a client-side session table 146 local to the client, using a client-side session ID 148 generated by the session ID generator 144 as a lookup key. In this scenario, since there is a single client, client sharing is not used (i.e., the sharing mode is 1a), and the client 202 generates the session ID based on the reference ID 214, the service URL of the service 204, and the user credentials of the first user. For example, the client side session ID 148 may be generated by concatenating the reference ID, the service URL, and a hash code based on the user credential together to form a single value. Hash codes of the reference ID and service URL may alternatively be used in the session ID instead of the actual values, or the actual values or other values based on the actual values may be used.

The client 202 can now request that the server 204 perform the first operation 206. The client 202 retrieves the secret key provided by the service 204 from the local session table using the session ID, and creates a request message representing the operation 206. The client encrypts the data in the request message 116 and adds the SCT_ID retrieved from the lookup table 148 (for the secret key) to the request message. In client sharing mode 1a, there is no need to include the user authentication credentials 107 in each request message 116, since each session is associated with a single user 106. Alternatively, in client sharing mode 1b, the user credentials 107 are sent in the request message 116 so that the particular user 106 using the session can be re-authenticated. The request message is sent to the server 204, which receives the message, authenticates the user credentials if they are present in the message, and, if authentication is successful, extracts the SCT_ID from the message for use in generating the service-side session ID.

As described above, the service-side session ID in the example of FIG. 2A is generated using service-side sharing mode 1, since there is a single service 204 in FIG. 2A. The service 204 thus generates the service-side session ID 168 as service port ID+SCT_ID and queries the service-side session table 166 for an entry having that session ID 168. The previously-stored secret key 170 is found in the session table, and the service 204 uses the secret key to decrypt the request message 116. The service 204 executes service logic to perform the operation 206 requested by the first user, and encrypts the results of the operation using the secret key. The encrypted results are sent to the client 202 in a response message 132. The client receives the response message, and queries the local session table 146 for an entry having a session ID based on the reference ID, server URL, and user credential, generated as described above. The previously-stored secret key 150 is found, and used by the client 102 to decrypt the response data received in the response message 132. The response data is then provided to the first user as output of the operation 206.

The first user 206 then requests a second web service operation 212 at the client 202. The second and subsequent web service operations requested by the first user 206 will use the secret keys stored in the local session tables of the client 202 and service 204 as described above. Therefore, no key exchange is necessary for the second and subsequent invocations of the web service 204 by the first user from the client 202, at least until such time as the key expires or is deleted. The secret key may eventually expire, e.g., if it is not used for a certain period of time, or if it is used for more than a maximum period of time.

A second user 208 then requests a third web service operation 214 at the client 202, still in client sharing mode 1a. Since the second user has not previously been seen by the client 202 in this example (at least since the client 202 started maintaining the current local lookup table), the client 202 does not find the session ID for the second user (e.g., reference ID+service URL+second user's credentials) in the local session table. In client sharing mode 1b (re-authentication, the client would find the existing session ID for the second reference with session ID=reference ID+service URL, because the user credentials are not part of the session ID. Continuing with the example for mode 1a, the client 202 therefore requests a secret key for the second user from the service 204, which creates and stores a secret key in the service-side session table as described above for the first user's first operation 206. The service 204 provides the secret key to the client 202 as described above, and the client 202 can then communicate with the server 202 using a secure conversation based on the secret key created for the second user invoking the service URL and port 218 of the service 204 from the reference 214 of the first client 202. In sharing mode 1b, the client includes the user credentials in the request message sent to the service.

Figure 2B:
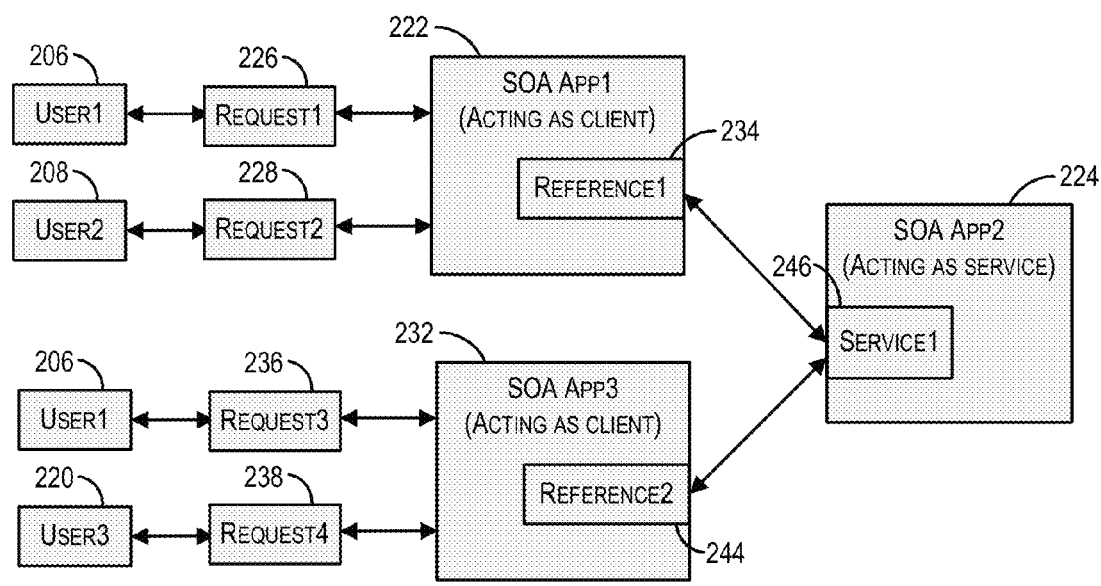
FIG. 2B is an illustrative drawing of web service invocations from multiple clients to one service by multiple users in accordance with embodiments of the invention.

FIG. 2B is an illustrative drawing of web service invocations from multiple clients to one service by multiple users in accordance with embodiments of the invention. In the example of FIG. 2B, which corresponds to client sharing mode 2a, the client-side session ID is generated as service URL+endorser credential+user credential. The client's reference ID is not part of the session ID in mode 2a. The client-side processing in mode 2a is similar to that of mode 1, except that the reference ID is not included in the session ID. The service-side processing for the many-to-one example of FIG. 2B in this case is similar to that of FIG. 2A, since there is a single service 224, which is service sharing mode 1, in which the service-side session ID is based on the service port and the SCT_ID extracted from the request message.

Figure 3:
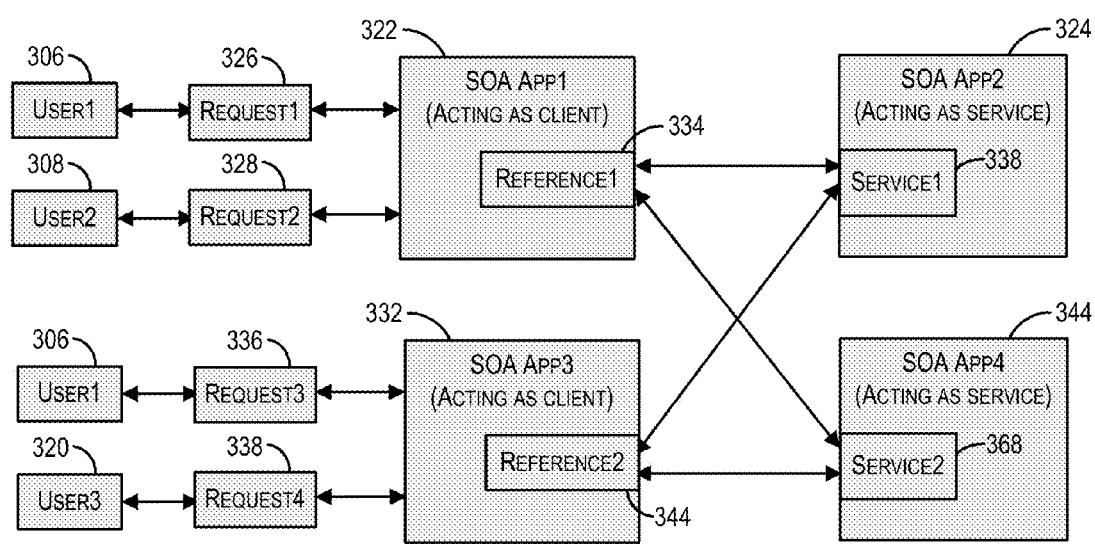
FIG. 3 is an illustrative drawing of web service invocations from multiple clients to multiple services by multiple users in accordance with embodiments of the invention.

FIG. 3 is an illustrative drawing of web service invocations from multiple clients to multiple services by multiple users in accordance with embodiments of the invention. In the example of FIG. 3, which corresponds to client sharing mode 3a, the client-side session ID is generated as service group ID+endorser credential+user credential. The client-side processing in mode 3a is similar to that of mode 2a, except that the service group ID is used instead of the service port ID. The service side processing in the example of FIG. 3 corresponds to service sharing mode 2, since there is a group of services 344. Thus the service-side session ID is generated as service group ID+SCT_ID in FIG. 3.

Figure 4:
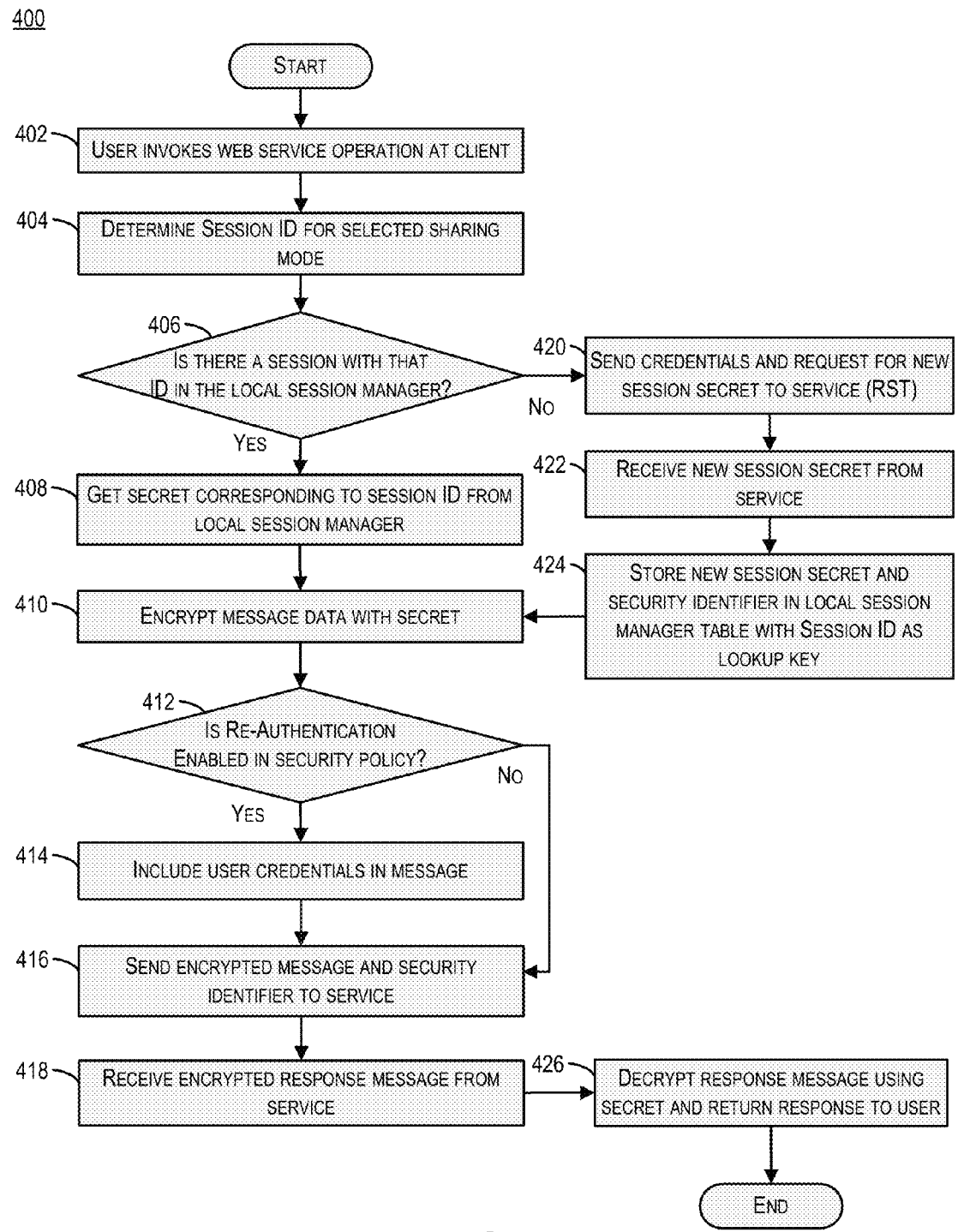
FIG. 4 is an illustrative flow diagram of a process of invoking a web service using sharable sessions in accordance with embodiments of the invention.

FIG. 4 is an illustrative flow diagram of a process 400 of invoking a web service using sharable sessions in accordance with embodiments of the invention. In one set of embodiments, process 400 can be performed by the client-side session manager 140 and/or the server-side session manager 160 of system 100. In other embodiments, process 400 can be performed by some other component of system 100, such as a centralized session manager (not shown) that is in communication with the session manager 140. Process 400 can be implemented in hardware, software, or a combination thereof. As software, process 400 can be implemented as program code that is encoded on a non-transitory computer-readable storage medium.

Process 400 begins at block 402 when a requesting entity, such as a user 106 at a client computer. causes an operation provided by a web service 104 to be invoked. For example, the user 106 can select a command in an application 102 that results in the application invoking a client-side web service programming interface, which in turn causes block 402 to be invoked as part of the invocation of the web service 104. In one aspect, the web service invocation involves a request message 116 being sent from the client 102 to a service 104, the service logic 126 on the service performing the requested operation, and a response message 132 being sent from the service back to the client. The web service 104 may be provided by a server process, which may be located on a different computer system, e.g., on a server computer to which the client sends a request message via a network, or on the same computer system as the client, in which case the client can communicate the request message 116 to the server process by an appropriate means, e.g., inter-process communication. The request message is sent from a client "reference" 114 which is, for example, a Web service endpoint, to the service, and the service sends the response message 132 back to the client reference 114.

Block 404 determines a session ID 148 for the client sharing mode 192. The selected sharing mode can be specified as a configuration parameter of the client, e.g., in a property or security policy in a client security context 190 associated with the client or client reference. The client sharing mode 192 can be determined based upon information and criteria known at design time and/or run time. Block 404 can use the processes shown in FIGS. 7 and 9 to determine the session ID for the client sharing mode 192.

Block 406 determines if there is a session with that ID in the local session manager 140 (on a client) or 160 (on a server). For example, the session manager 140 searches the session table 146 for an entry that associates that session ID with a secret key 150 and SCT_ID 151. If such an entry is not found, control transfers to block 420, which sends a request for a new secret key to a service, e.g., the SOA service app 104 or other key generator service. The service sends the generated key back to the client 102, which receives the key at block 422. At block 424, the local (client-side in this example) session manager 140 stores the received secret key 150 and an associated secret key identifier 151, referred to herein as an SCT_ID, that identifies the secret key. The secret key identifier can be generated on the service 104 and sent to the client 102 with the secret key. The secret key 150 and identifier 151 are stored in the session table 146 using the session ID 148 as a lookup key. That is, an entry is created in the session table 146, and the entry includes the session ID 148, the secret key 150, and the secret key identifier 151. The entry can be retrieved by searching the session table 146 for an entry having the session ID 148. The session ID is thus used as a lookup key for retrieving entries with given session ID's from the session table 146. execution the continues at block 410 as described below. Alternatively, if block 406 determines that there is an existing entry with the determined session ID 148 in the local session manager, then block 408 retrieves the secret key 150 and secret key identifier 151 associated with that session ID 148 by that entry.

Block 410 encrypts the request data 108 using the secret key 150, and adds encrypted request data and the plaintext (i.e., non-encrypted) secret key identifier 151 to the request message 116. Block 412 determines whether a sharing mode that uses re-authentication has been specified. Block 412 thus checks if a security policy associated with the request, such as a security policy associated with the client reference 114, has an attribute with a re-authenticate flag equal to true. If so, then block 414 includes user credentials in the request message 116. If not, then block 414 does not include the user credentials in the request message 116, although the user credentials may be included in the message 116 for other reasons, e.g., to provide authentication information when otherwise not known. Block 416 send the encrypted message and plain text security identifier to the service. Block 418 receives the encrypted response message from the service. Block 426 decrypts the response message using the Secret key 150 and returns the response to the user or other requesting entity.

Figure 5:
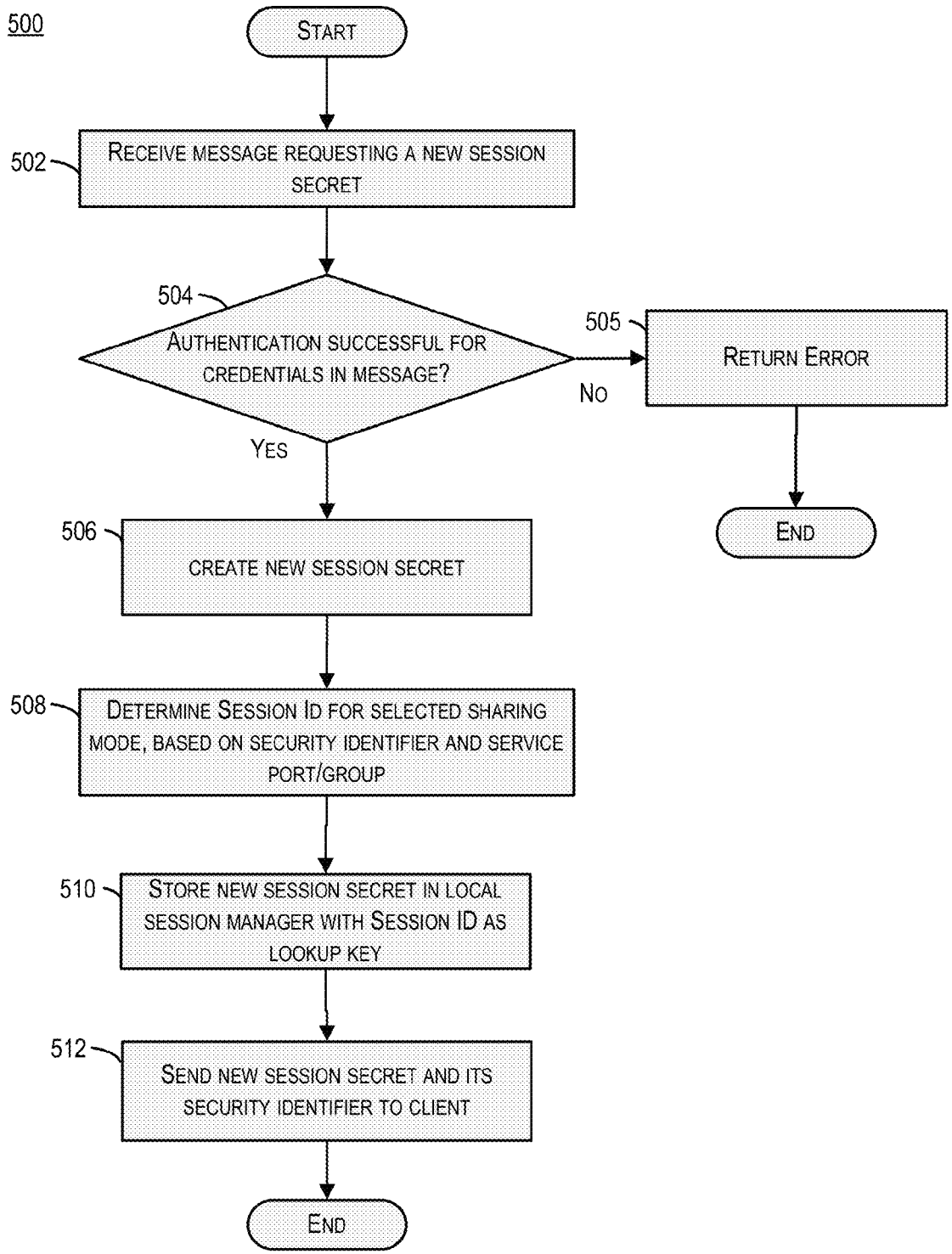
FIG. 5 is an illustrative flow diagram of a process 500 of generating a new session secret at a service in accordance with embodiments of the invention.

FIG. 5 is an illustrative flow diagram of a process 500 of generating a new session secret at a service in accordance with embodiments of the invention. In one set of embodiments, process 500 can be performed by the server-side session manager 160 and/or the client-side session manager 140 of system 100. In other embodiments, process 500 can be performed by some other component of system 100, such as a centralized secret-generator service (not shown) that is in communication with the session manager 160. Process 500 can be implemented in hardware, software, or a combination thereof. As software, process 500 can be implemented as program code that is encoded on a non-transitory computer-readable storage medium.

Process 500 begins at block 502 when a web service application 104 or other secret-generator service receives a request for a new session secret, e.g., in a SOAP request message. Block 504 retrieves authentication credentials from the request and authenticates the credentials or otherwise determines if the credentials indicate that the sender of the request has been successfully authenticated. If the authentication fails or the sender has not been successfully authenticated, then block 505 returns an error status and the process ends. If authentication is successful, then block, 506 creates a new session secret (e.g. a secret key). Block 508 generates the session identifier for the selected sharing mode. On the service 104 the session identifier is generated as, for example, a concatenation of the service port or group identifier and the security identifier for the session secret (SCT_ID). Block 510 stores the new session secret in the local session manager 160, using the session identifier as a lookup key. Block 512 sends the new session secret and its SCT_ID to the client as a response, e.g., in a SOAP response message.

Figure 6:
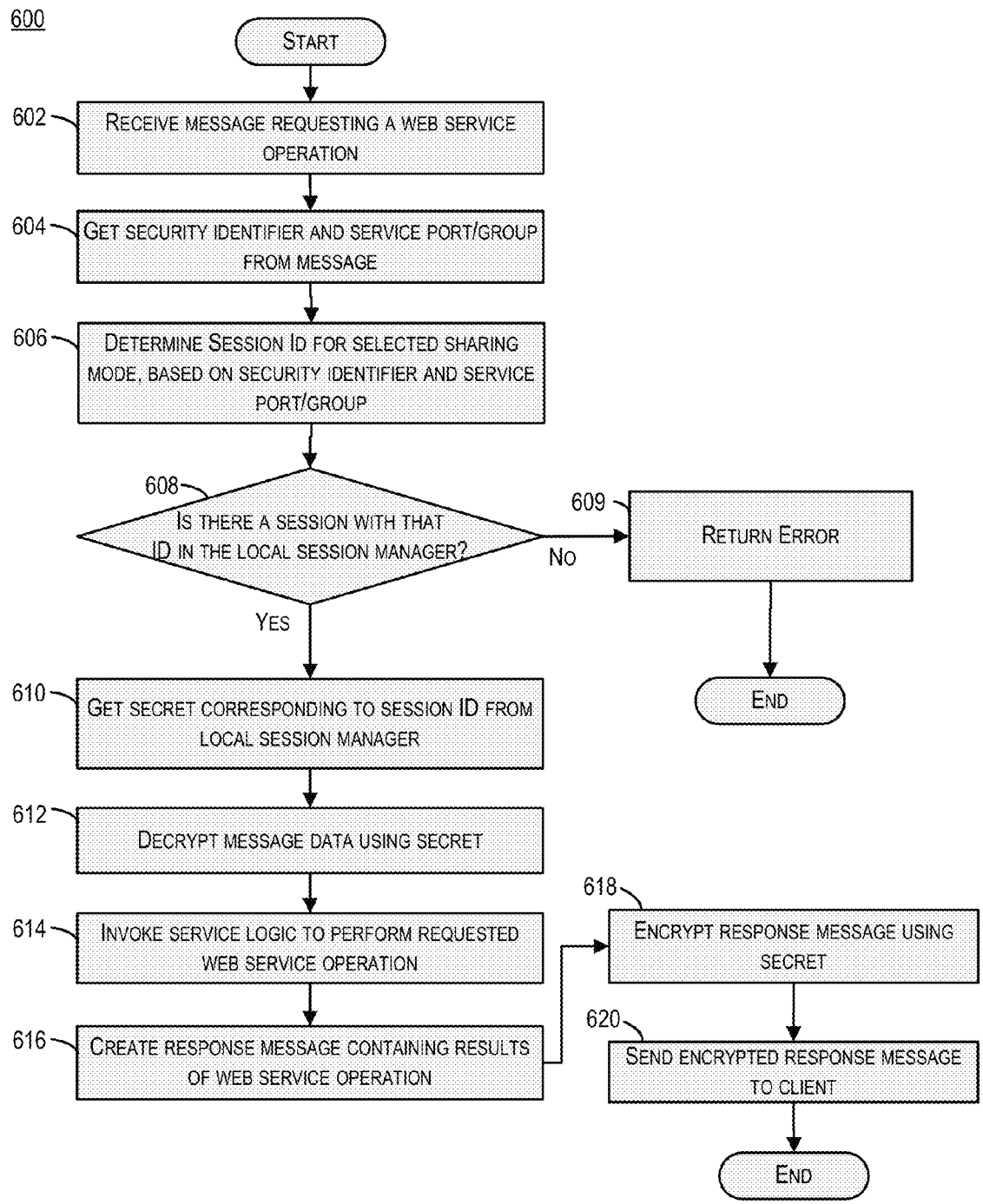
FIG. 6 is an illustrative flow diagram of a process of receiving and processing a web service invocation using sharable sessions at a server in accordance with embodiments of the invention.

FIG. 6 is an illustrative flow diagram of a process 600 of receiving and processing a web service invocation using sharable sessions at a server in accordance with embodiments of the invention. In one set of embodiments, process 600 can be performed by the web service 104 of system 100. Process 600 can be implemented in hardware, software, or a combination thereof. As software, process 600 can be implemented as program code that is encoded on a non-transitory computer-readable storage medium.

Process 600 begins at block 602, which receives a request, e.g., a SOAP request message, to perform a web service operation. Block 604 retrieves a security identifier and service port or group identifier from the message. Block 606 generates a session identifier for the selected sharing mode. The session identifier is generated by, for example, concatenating the security identifier and the web service port or group identifier. Block 608 determines if there is a session with the generated session identifier in the local session manager 160. If not, then block 609 returns an error to the requesting entity.

If block 608 determines that there is a session with the generated ID in the local session manager 160, then block 610 gets the secret corresponding to the session identifier from the local session manager 160. Block 612 uses the secret to decrypt the request (e.g., SOAP message data) that was received at block 602. Block 614 invokes web service logic, e.g., the service logic 126 of system 100, to perform the requested web service operation. Block 616 creates a response message containing the results of the web service operation, such as data retrieved and/or generated by the operation. Block 618 generates and encrypts a response message using the secret, and block 620 sends the encrypted response message to the client.

Figure 7:
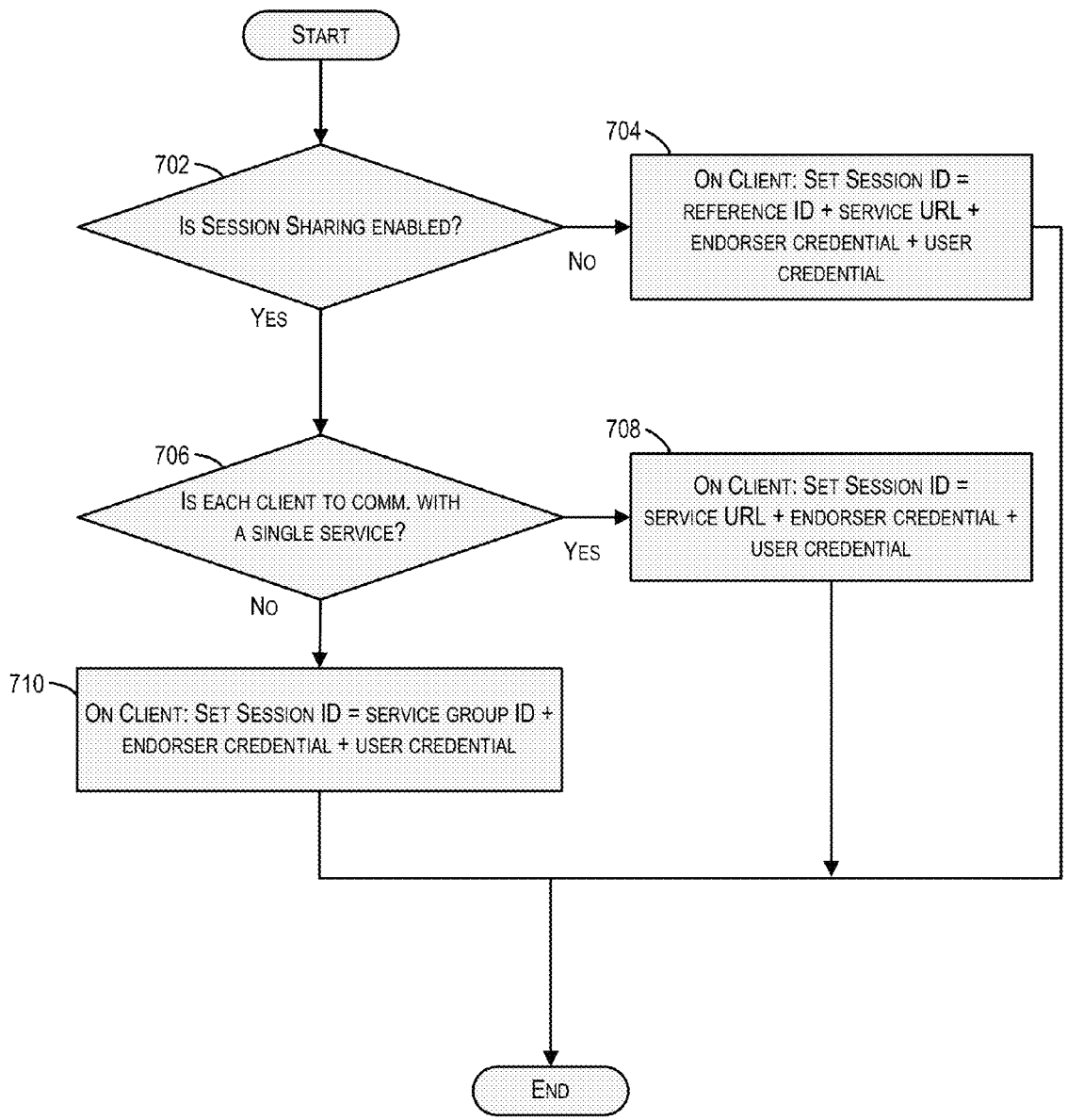
FIG. 7 is an illustrative flow diagram of a process 700 of generating a client-side per-user session ID in accordance with embodiments of the invention.

FIG. 7 is an illustrative flow diagram of a process 700 of generating a client-side per-user session ID in accordance with embodiments of the invention. In one set of embodiments, process 700 can be performed by the client-side session manager 140 of system 100. Process 700 can be implemented in hardware, software, or a combination thereof. As software, process 700 can be implemented as program code that is encoded on a non-transitory computer-readable storage medium.

Process 700 sets the client session ID 148 if the client sharing mode 192 is 1a, 2a, or 3a, i.e., one user per session without re-authentication. Block 702 determines whether the client sharing mode 192 is mode 1a, i.e., whether multiple-client session sharing is disabled. If the client sharing mode 192 is 1a, then block 704 sets the client session ID 148 to the client reference ID 114+the service URL of the service 104+ the endorser credential 182 (which may be empty)+the user credential, as shown in Table 1. As introduced above, mode 1 corresponds to the case of per-user session reuse with no sharing among applications, and re-uses sessions for multiple invocations of a web service by a user at a client, with a new session being created for each different user (without sharing session across multiple clients or services). The session encryption key 110 is re-used for the same user on the same client reference, but different encryption keys are created for each different combination of client reference, service URL, endorser credential (if present), and user credential.

If block 702 determines that the client sharing mode is not 1, then block 706 determines whether the mode 192 is 2a, e.g., multiple clients and a single service. If so, block 708 sets the client session ID 148 to the service URL+the endorser credential (if present)+the user credential, as shown in Table 1. Mode 2a corresponds to the case of sessions that are shared from multiple clients to a single service port, with one user per session. In mode 2a, multiple clients can share a session (to invoke a single web service), and session encryption keys are re-used for the same user on the same or different client references, but different encryption keys are created for each different combination of service URL, endorser credential (if present), and user credential.

If block 706 determines that the sharing mode 192 is 3a, e.g., multiple clients to a group of services, then block 710 sets the client session ID 148 to the service group ID+the endorser credential 182 (which may be empty)+the user credential, as shown in Table 1. Mode 3a corresponds to the case of sessions that are shared from multiple clients to a group of services, with one user per session, and allows multiple clients to share the session to invoke multiple web services.

Figure 8:
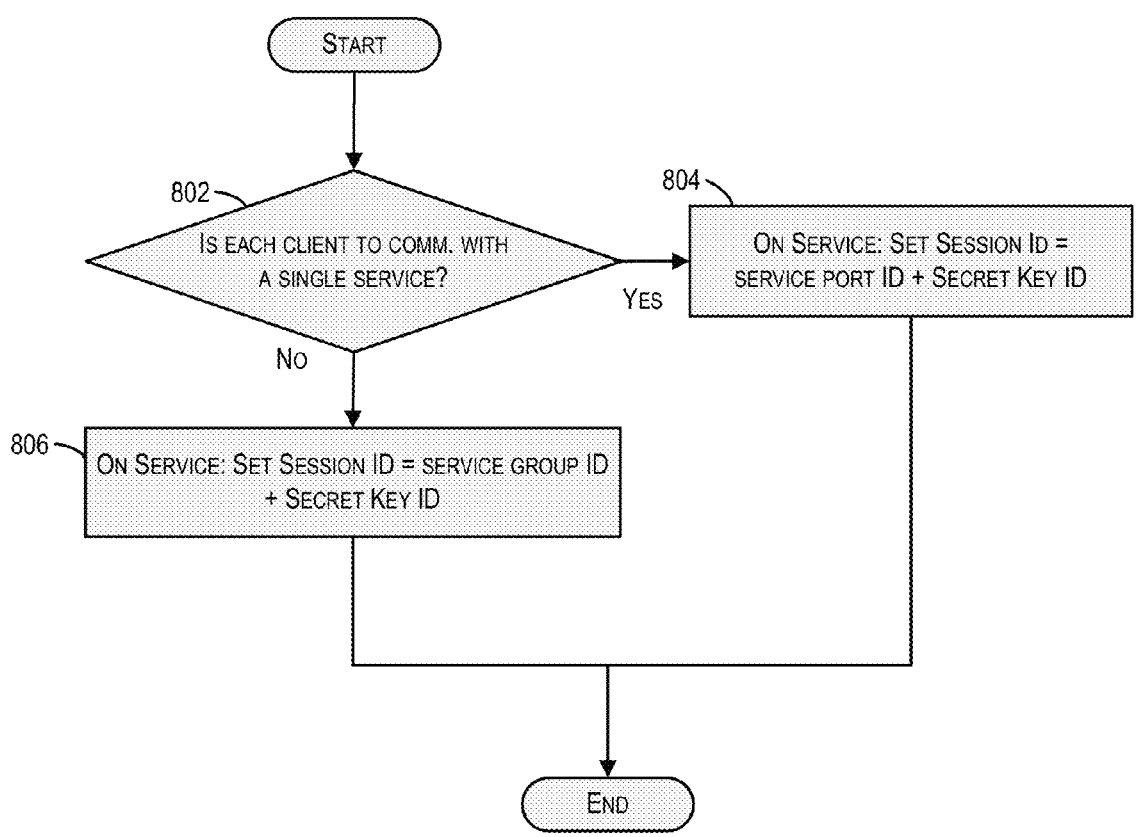
FIG. 8 is an illustrative flow diagram of a process of generating a service-side session ID in accordance with embodiments of the invention.

FIG. 8 is an illustrative flow diagram of a process of generating a service-side session ID in accordance with embodiments of the invention. In one set of embodiments, process 800 can be performed by the server-side session manager 160 of system 100. Process 800 can be implemented in hardware, software, or a combination thereof. As software, process 800 can be implemented as program code that is encoded on a non-transitory computer-readable storage medium.

Process 800 begins at block 802 by determining if the service sharing mode is 1, in which each client is able to communicate with a single service. If the service sharing mode is 1, block 804 sets the service session ID 168 to the service port ID+the secret key 120 (e.g., the SCT_ID), as shown in Table 2. In service sharing mode 1, sessions are re-used for communication with one or more clients from a particular service port of the service 104 if the same secret key 120 is used in each communication. Service mode 1 corresponds to the case of re-use of a session for multiple invocations of a web service port by any user at a client, with the session being re-used by multiple users and/or clients that use the same secret key 120 (i.e., have the same SCT_ID). A separate session (with separate encryption keys) is created for each communication to a client from a different service port and/or using a different secret key (compared to any existing communication session in the service application) in service mode 1.

block 802 determines that the service sharing mode 196 is 2, in which each client is to be able to communicate with multiple services, then block 806 sets the service session ID 168 to the service group ID+the security ID (SCT_ID), as shown in Table 2. Service sharing mode 2 corresponds to the case of re-use of a session for multiple invocations of a web service group by any user at a client, with the session being re-used by multiple users and/or clients that have the same secret key 110 (i.e., the same SCT_ID). The session ID generated for service mode 2 is similar to that of service mode 1, except that in mode 2 a service group is used in the session ID 168 place of a service port.

Figure 9:
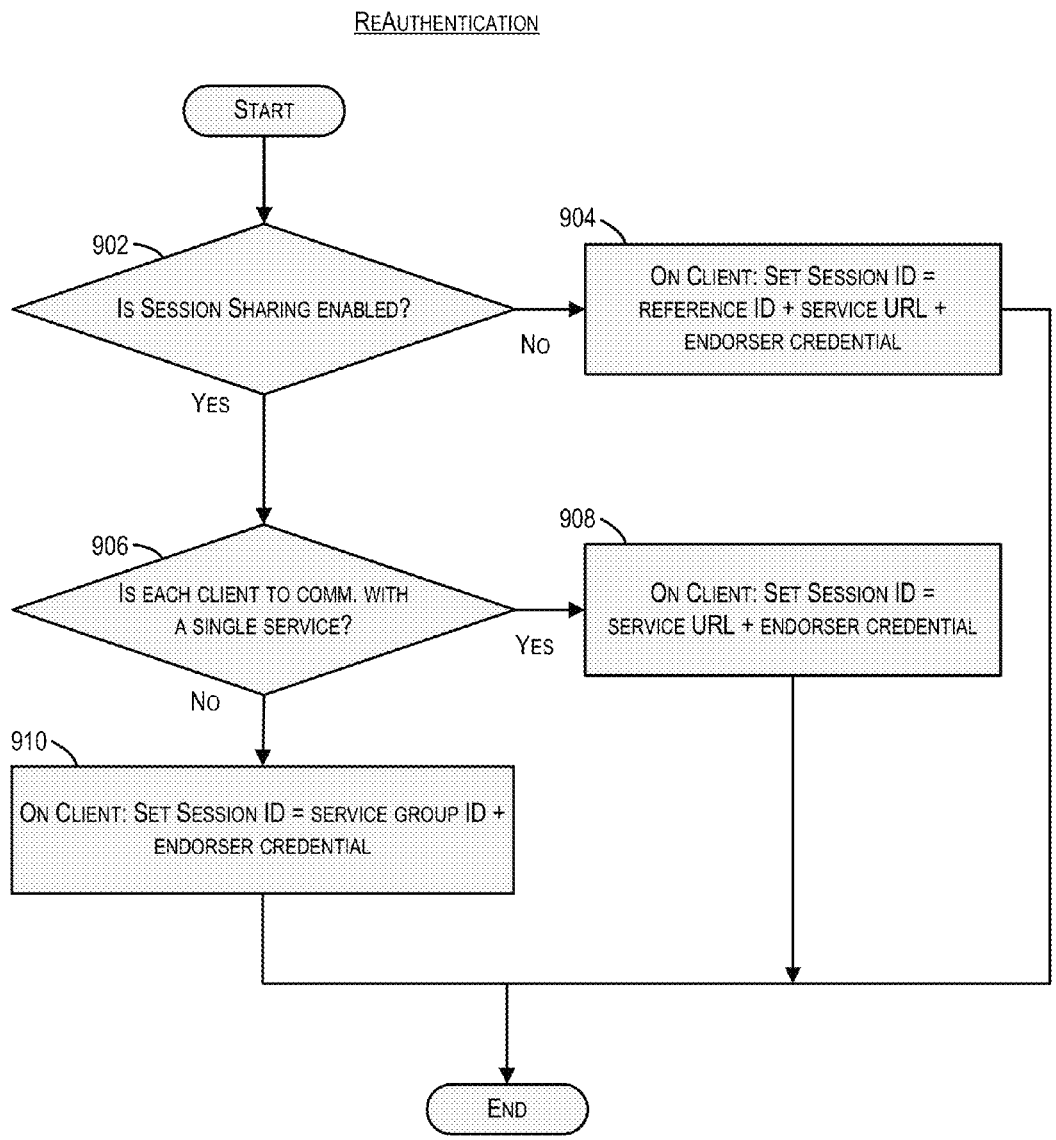
FIG. 9 is an illustrative flow diagram of a process of generating a client-side multi-user session ID in accordance with embodiments of the invention.

FIG. 9 is an illustrative flow diagram of a process of generating a client-side multi-user session ID in accordance with embodiments of the invention. The process of FIG. 9 sets the service session ID in the re-authentication cases (1b, 2b, and 3b). In one embodiment, as shown in Table 1, the re-authentication cases 1b, 2b, and 3b have a client sharing mode 192 equal to 1, 2, or 3, and a re-authenticate flag in the client security context 190 equal to "true". Further, in that embodiment, the non-re-authentication cases, 1a, 2a, and 3a, also have a client sharing mode 192 equal to 1, 2, or 3, but have a re-authenticate flag equal to "false". In another embodiment, the client sharing mode 192 can use a different representation, e.g., a single value such as 3b or 4 that represents sharing mode 3b, which case a re-authenticate flag is not needed.

The process of FIG. 9 sets the client session ID 148 if the client sharing mode 192 is 1b, 2b, or 3b, i.e., in the cases having multiple users per session using re-authentication. Block 902 determines whether the client sharing mode 192 is mode 1b, e.g., whether multiple-client session sharing is disabled and re-authentication is enabled. If the client sharing mode 192 is 1b, then block 904 sets the client session ID 148 to the client reference ID 114+the service URL of the service 104+the endorser credential 182 (which may be empty), as shown in Table 1. As shown in Table 1, mode 1b corresponds to the case of multiple-user session reuse with no sharing among client applications, and re-uses sessions for multiple invocations of a web service by any user at a client, with each request being authenticated (without sharing the session across multiple clients or services). In mode 1b, session encryption keys are re-used for users on the same client reference, but different encryption keys are created for each different combination of client reference, service URL, and endorser credential.

If block 902 determines that the client sharing mode is not 1b, then block 906 determines whether the mode is 2b, e.g., multiple clients and a single service with re-authentication. If so, block 908 sets the client session ID 148 to the service URL+the endorser credential (if present), as shown in Table 1. Mode 2b corresponds to the case of sessions that are shared from multiple clients to a single service port, with multiple users being able to share a session. Mode 2b allows multiple clients to share the session (to invoke a single web service), and session encryption keys are re-used for different users on the same or different client references, but different encryption keys are created for each different user and each different service URL. If block 906 determines that the sharing mode 192 is 3b, e.g., multiple clients to a group of services, then block 910 sets the client session ID 148 to the service group ID+the endorser credential (which may be empty), as shown in Table 1. Mode 3b corresponds to the case of sessions that can have one or more users and can be shared from multiple clients to a group of services, thereby allowing multiple clients to share the session to invoke multiple web services.

Figure 10:
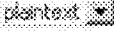
FIG. 10 is an illustrative drawing of a secure conversation configuration user interface in accordance with an embodiment of the present invention.

FIG. 10 is an illustrative drawing of a secure conversation configuration user interface 1000 in accordance with embodiments of the present invention. In one configuration, the UI includes two checkboxes labeled Enable Secure Conversation and Re-authenticate. Re-authenticate should be disabled by default and only enabled when the secure conversation checkbox is selected (or not shown, depending on other policy user interface screens for consistency). When a user selects "Enable Secure Conversation", the "require-derived-key" in Message Security Setting section is set to true for Wss10 and Wss11 since the default value of require-derived-key should be true for secure conversation.

Figure 11:
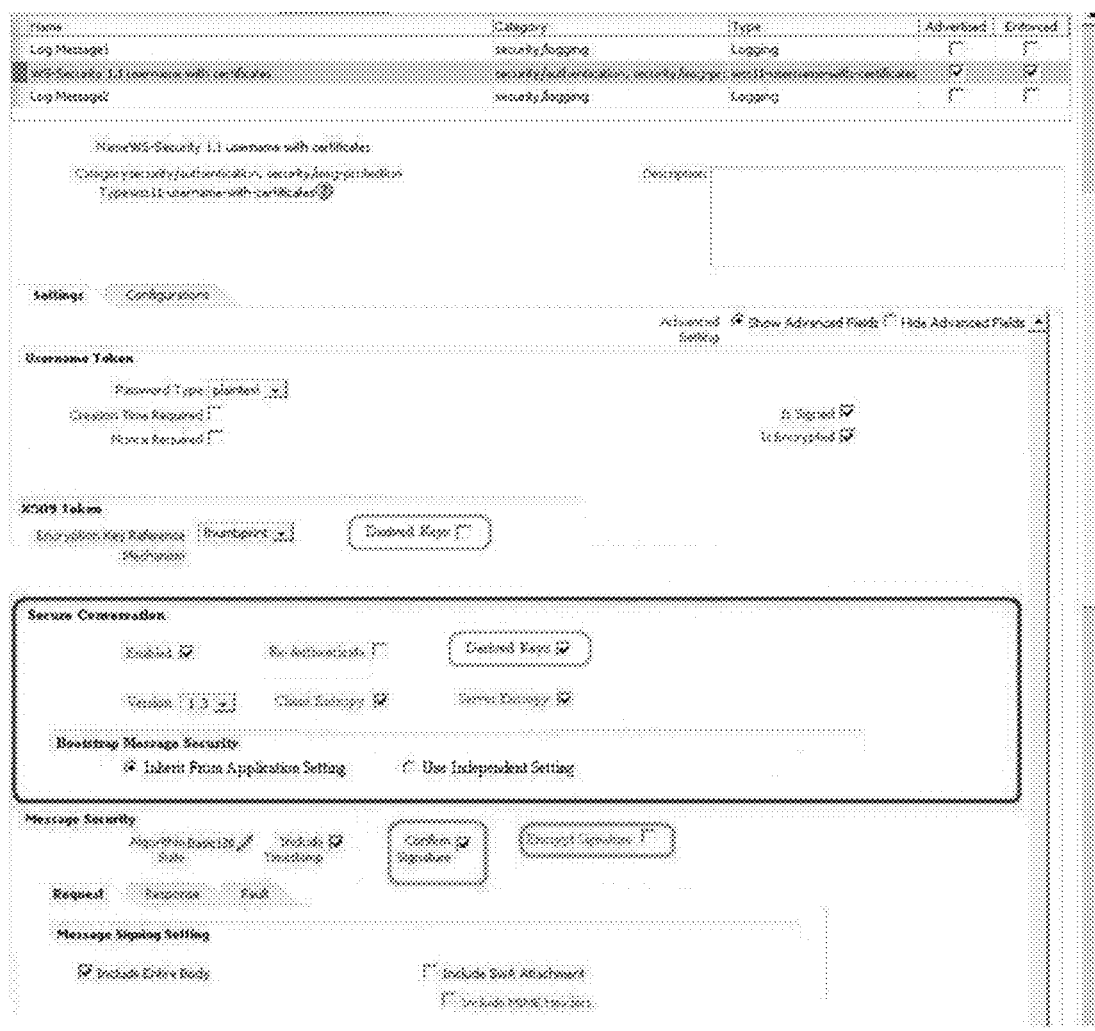
FIGS. 11 and 12 are illustrative drawings of advanced secure conversation configuration user interfaces in accordance with embodiments of the present invention.
Figure 12:
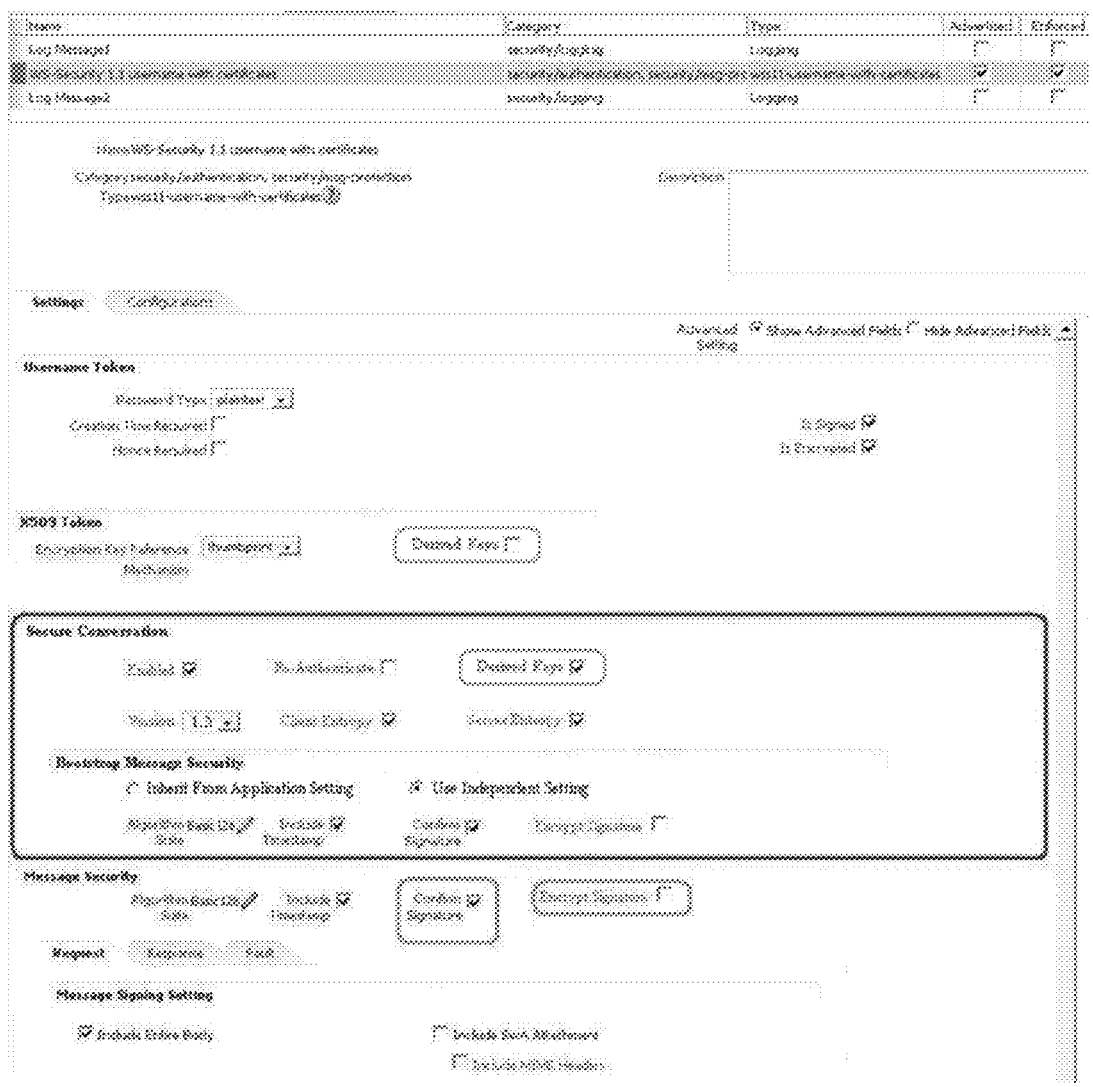

FIGS. 11 and 12 are illustrative drawings of advanced secure conversation configuration user interfaces 1100 and 1200 in accordance with embodiments of the present invention. Advanced configuration user interface 1100 has two sections: Basic configuration fields, which include the Enable Secure Conversation and Re-authenticate check boxes, and an additional settings screen, which includes a secure conversation version, a require client entropy checkbox, and a require server entropy checkbox. These fields are enabled only when secure conversation is enabled.

The additional settings also include message security settings for bootstrap (e.g., session establishment and secret key negotiation) assertion. A secure conversation policy can have two policies—inner and outer. The message security settings for the outer policy are defined in the original policy. The message security settings for the inner policy are derived from the outer policy and can use defaults, so inner policy settings are not shown in the user interface. However, in certain cases, it may be desirable to configure inner policy message security settings independently of outer policy message security settings. In that case, the policy authoring user interface can allow the user to explicitly make a decision to create inner policy settings independent of the outer policy settings. Any change in outer policy can also affect the inner policy.

Algorithm Suite is shown as a checkbox for convenience, but it can include options to choose from various algorithm suites. In the message security section, as mentioned earlier, if the user does not want to use default settings for the inner policy and does not want the settings to derive from the outer policy, he should explicitly declare them independent, in which case a copy is made and after that, changes in the outer policy message security settings will not affect the inner policy.

The user interface 1100 illustrated in FIG. 11 shows one example of how this can be done. User interface 1100 includes a toggle button which changes from "Change the defaults" to "Reset to defaults". By default, the first button "Change the defaults" is shown with no fields which indicates that the values are derived from the outer policy. When the user clicks on "Change the defaults", the button toggles to "Reset to defaults" and a copy of the fields is created and shown with current values. If the user changes the outer policy during policy authoring, these should be changed on this page as well. If the user clicks "Reset to defaults", the user interface reverts back to this button, hides the fields, and no msg-security element in the policy will be generated.

Alternatively, the message security settings for inner policy can also be moved under outer message security settings. Since inner policy values are derived from outer, placing them under the outer policy may be more intuitive for user and may make it clear when the user decides to make a copy and make them independent. The user interface 1200 shown in FIG. 12 illustrates this alternative.

Figure 13:
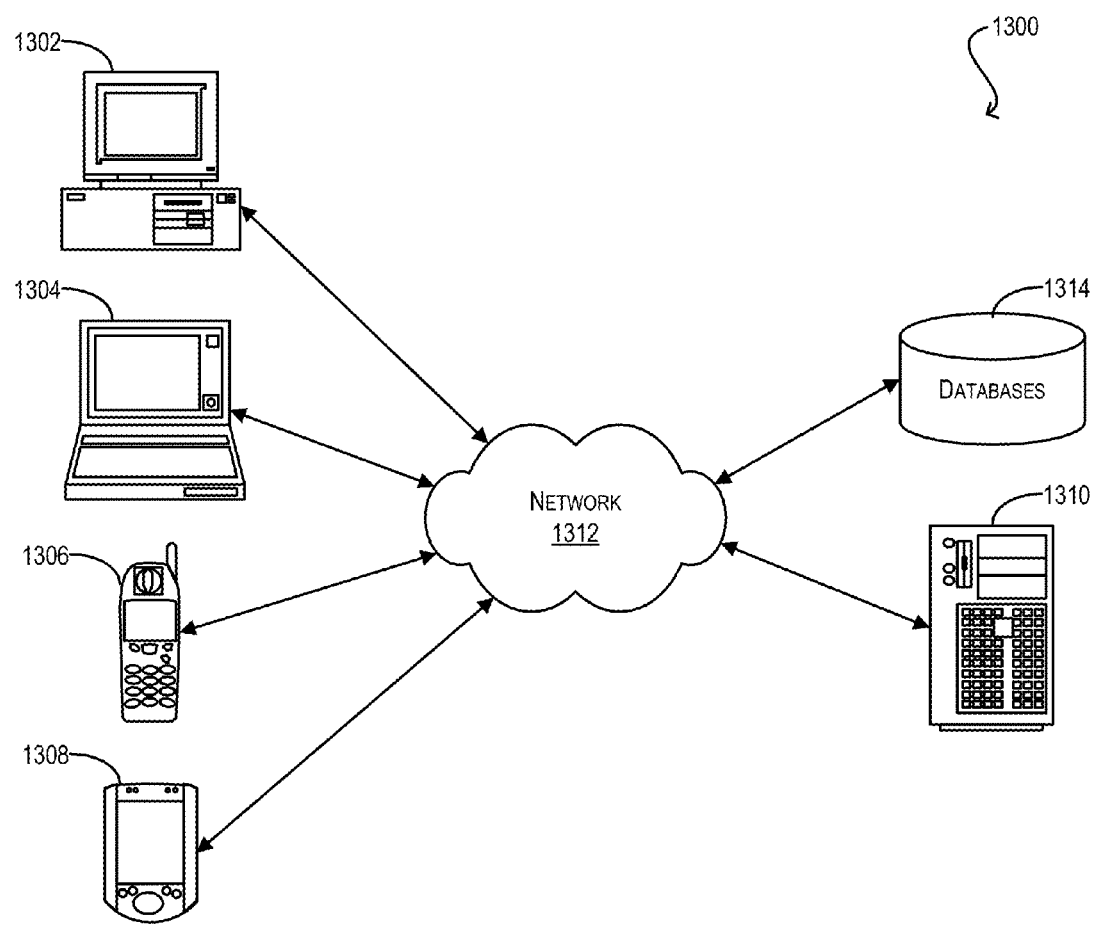
FIG. 13 is a simplified block diagram illustrating a system environment that can be used in accordance with an embodiment of the present invention.

FIG. 13 is a simplified block diagram illustrating a system environment 1300 that can be used in accordance with an embodiment of the present invention. As shown, system environment 1300 can include one or more client computing devices 1302, 1304, 1306, 1308, which can be configured to operate a client application such as a web browser, a UNIX/Solaris terminal application, and/or the like. In various embodiments, client computing devices 1302, 1304, 1306, 1308 can correspond to components of the system 100 of FIG. 1.

Client computing devices 1302, 1304, 1306, 1308 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1302, 1304, 1306, 1308 can be any other electronic device capable of communicating over a network, such as network 1312 described below. Although system environment 1300 is shown with four client computing devices, it should be appreciated that any number of client computing devices can be supported.

System environment 1300 can further include a network 1312. Network 1312 can be any type of network familiar to those skilled in the art that can support data communications using a network protocol, such as TCP/IP, SNA, IPX, AppleTalk, and the like. Merely by way of example, network 1312 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1300 can further include one or more server computers 1310 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Server 1310 can run an operating system including any of those discussed above, as well as any commercially available server operating system. Server 1310 can also run any of a variety of server applications and/or mid-tier applications, including web servers, FTP servers, CGI servers, Java virtual machines, and the like.

System environment 1300 can further include one or more databases 1314. In one set of embodiments, databases 1314 can include databases that are managed by server 1310. Databases 1314 can reside in a variety of locations. By way of example, databases 1314 can reside on a storage medium local to (and/or resident in) one or more of computers 1302, 1304, 1306, 1308, and 1310. Alternatively, databases 1314 can be remote from any or all of computers 1302, 1304, 1306, 1308, and 1310, and/or in communication (e.g., via network 1312) with one or more of these. In one set of embodiments, databases 1314 can reside in a storage-area network (SAN) familiar to those skilled in the art.

Figure 14:
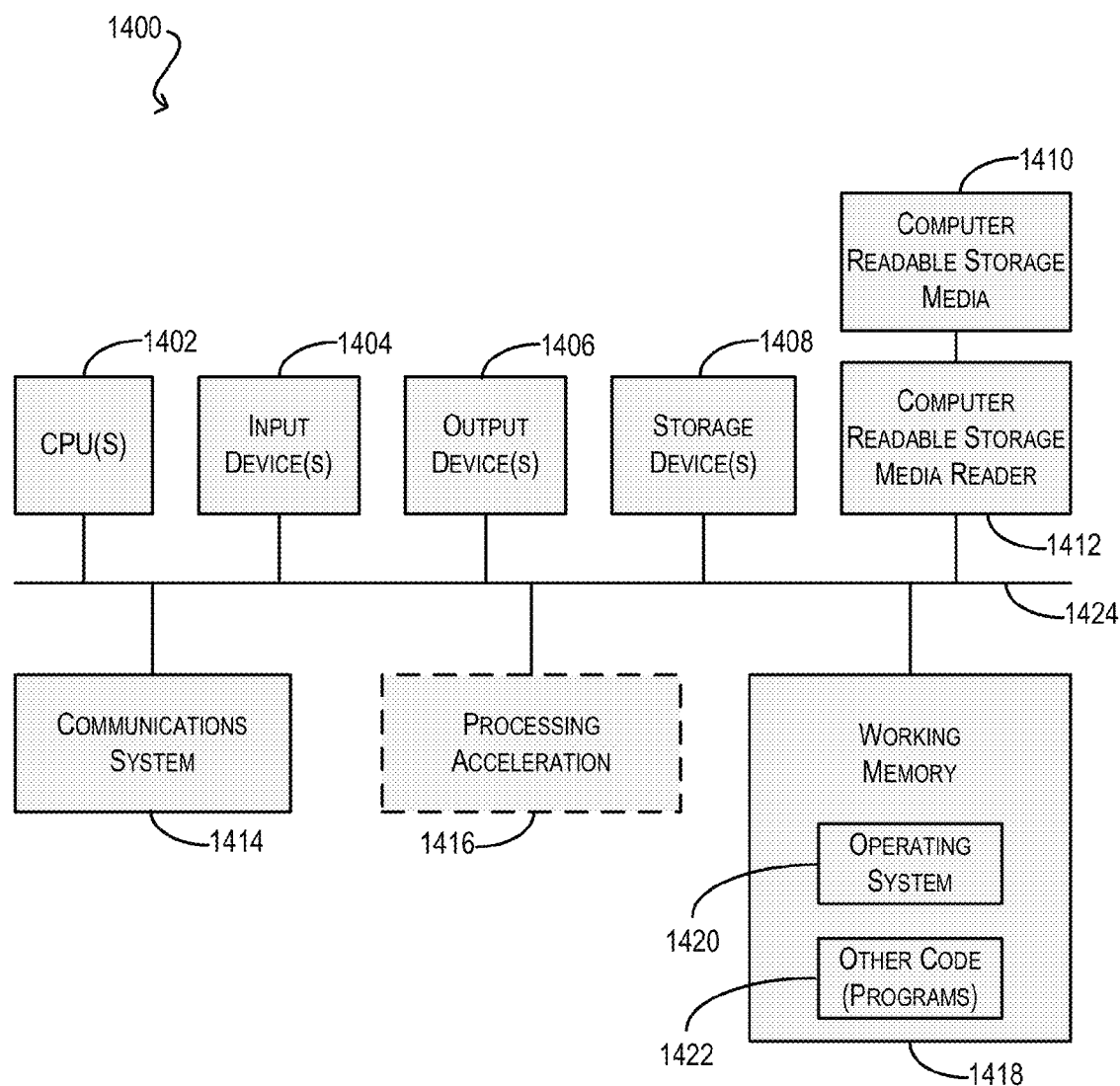
FIG. 14 is a simplified block diagram illustrating a computer system that can be used in accordance with an embodiment of the present invention.

FIG. 14 is a simplified block diagram illustrating a computer system 1400 that can be used in accordance with an embodiment of the present invention. In various embodiments, computer system 1400 can be used to implement any of computers 1302, 1304, 1306, 1308, and 1310 described with respect to system environment 1300 above. As shown, computer system 1400 can include hardware elements that are electrically coupled via a bus 1424. The hardware elements can include one or more central processing units (CPUs) 1402, one or more input devices 1404 (e.g., a mouse, a keyboard, etc.), and one or more output devices 1406 (e.g., a display device, a printer, etc.). Computer system 1400 can also include one or more storage devices 1408. By way of example, the storage device(s) 1408 can include devices such as disk drives, optical storage devices, and solid-state storage devices such as a random access memory (RAM) and/or a read-only memory (ROM), which can be programmable, flash-updateable and/or the like.

Computer system 1400 can additionally include a computer-readable storage media reader 1412, a communications subsystem 1414 (e.g., a modem, a network card (wireless or wired), an infra-red communication device, etc.), and working memory 1418, which can include RAM and ROM devices as described above. In some embodiments, computer system 1400 can also include a processing acceleration unit 1416, which can include a digital signal processor (DSP), a special-purpose processor, and/or the like.

Computer-readable storage media reader 1412 can be connected to a computer-readable storage medium 1410, together (and, optionally, in combination with storage device(s) 1408) comprehensively representing remote, local, fixed, and/or removable storage devices plus storage media for temporarily and/or more permanently containing computer-readable information. Communications system 1414 can permit data to be exchanged with network 1312 and/or any other computer described above with respect to system environment 1300.

Computer system 1400 can also comprise software elements, shown as being currently located within working memory 1418, including an operating system 1420 and/or other code 1422, such as an application program (which may be a client application, Web browser, middle tier/server application, etc.). It should be appreciated that alternative embodiments of computer system 1400 can have numerous variations from that described above. For example, customized hardware can be used and particular elements can be implemented in hardware, software, or both. Further, connection to other computing devices such as network input/output devices can be employed.

Computer readable storage media 1410 for containing code, or portions of code, executable by computer system 1400 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, or any other medium that can be used to store data and/or program code and that can be accessed by a computer.

Although specific embodiments of the invention have been described above, various modifications, alterations, alternative constructions, and equivalents are within the scope of the invention. Further, although embodiments of the present invention have been described with respect to certain flow diagrams and steps, it should be apparent to those skilled in the art that the scope of the present invention is not limited to the described diagrams/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
    receiving, by a computer system hosting a first web service application configured as a client application to a second web server application or group of web services, a first request to send a first web service message to the second web service application or group of web services;
    retrieving, by the computer system, first existing communication session information from a database accessible to the first web service application storing one or more existing communication sessions, the first existing communication session information having the same sharing characteristics as the first request and generated in response to a second web service message associated with different credentials than that associated with the first web service message,
    wherein the sharing characteristics of the first request comprises environment information associated with the first web service application, request information associated with the first request, or a combination thereof, that includes first user credentials of a first user and a service locator identifying the second web service application or group of web services to invoke, and
    wherein retrieving the first existing communication session information comprises searching the one or more existing communication sessions for the first existing communication session information being associated with the service locator and security credentials including second user credentials of a second user; and
    communicating, by the computer system, the first web service message from the first web service application to the second application or group of web services using the first existing communication session information.

2. The method of claim 1, further comprising:
    communicating, by the computer system, a second web service message to a second application or group of web services associated with the second user, using second existing communication session information corresponding to the second user, concurrently with communicating the first web service message.

3. The method of claim 1, further comprising:
    receiving, by the computer system hosting the first web service application, a second request to send a second web service message to the second application or group of web services, the second request including second user credentials of a second user;
    searching, by the computer system, the one or more existing communication sessions for second existing communication session information associated with the service locator and the second user credentials;
    retrieving, by the computer system, the second existing communication session information from the one or more existing communication sessions; and
    communicating, by the computer system, the second web service message to the second application or group of web services using the second existing communication session information concurrently with communicating the first web service message.

4. The method of claim 1, wherein the security credentials include endorser credentials.

5. The method of claim 1, wherein searching the one or more existing communication sessions comprises:
    generating, by the computer system, a requested session key based upon the service locator and security credentials, the security credentials including the first user credentials;
    searching, by the computer system, a session table for an existing entry having an associated session key matching the requested session key; and
    retrieving the existing entry.

6. The method of claim 5, further comprising:
    creating, by the computer system, a new entry in the session table when there is no entry in the session table having an associated session key matching the requested session key.

7. The method of claim 1, wherein the first request is a request to send the first web service message to a web service URL included in the first request, and the service locator comprises the web service URL.

8. The method of claim 1, wherein the first request is a request to send the first web service message to a web service belonging to a configured web services group, and the service locator comprises a web service group identifier.

9. The method of claim 1, wherein the environment information further includes a client reference identifier, and retrieving the existing communication session information comprises:
    searching, by the computer system, the one or more existing communication sessions for an existing session associated with the client reference identifier, the service locator, and security credentials that include the first user credentials of the first user; and
    retrieving, by the computer system, the existing session associated with the client reference identifier from the one or more existing communication sessions.

10. The method of claim 1, wherein retrieving the existing communication session information comprises:
    retrieving, by the computer system, a secret key identifier from the request;
    searching, by the computer system, the one or more existing communication sessions for an existing session associated with the service locator and secret key identifier; and
    retrieving, by the computer system, the existing session associated with the service locator and secret key identifier from the one or more existing communication sessions.

11. The method of claim 10, wherein the service locator comprises a service port identifier that identifies the service.

12. The method of claim 10, wherein the service is a member of a group of services, and the service locator comprises a service group identifier that identifies the group of services.

13. A system comprising:
    a hardware processor; and
    a non-transitory member configured to store a set of instructions which when executed by the processor configure the processor to:
        receive a request to send a first web service message to one or more web services;
        determine a session identifier based upon web service environment information associated with the one or more web services, request information associated with the request, or a combination thereof, that includes first user credentials of a first user and a service locator identifying the one or more web services to invoke;
        retrieve from the memory first existing session information associated with the session identifier from one or more existing communication sessions stored in the memory based on searching the one or more existing communication sessions for the first existing communication session information being associated with the service locator and security credentials including second user credentials of a second user, the first existing session information generated in response to a second web service message associated with different credentials than that associated with the first web service message; and
        communicate the first message to the one or more second web services using the first existing session information.

14. The system of claim 13, wherein the web service environment information, the request information, or a combination thereof, includes a client reference identifier, and the processor is further configured to:
    communicate one or more subsequent messages to the one or more web services using the existing session information based on the client reference identifier.

15. The system of claim 13, wherein the processor is further configured to:
    communicate a second web service message to the one or more web services, using second existing communication session information corresponding to the second user, concurrently with communicating the first web service message.

16. The system of claim 13, wherein the service locator comprises a Uniform Resource Locator ("URL") associated with the one or more web services.

17. The system of claim 13, wherein the web service environment information, the request information, or a combination thereof comprises a client reference identifier and the processor is further configured to:
    combine the client reference identifier, the service locator, and the security credentials to produce the session identifier.

18. The system of claim 17, wherein the security credentials comprise endorser credentials generated by a security endorser.

19. The system of claim 13, wherein the processor is further configured to:
    combine the service locator and the security credentials to produce the session identifier.

20. The system of claim 13, wherein to determine the session identifier, the processor is configured to:
    receive a client sharing mode indicator that specifies a degree of session sharing to be used in communicating messages to the one or more web services,
    wherein the session identifier is determined based upon the client sharing mode indicator.

21. The system of claim 13, wherein the processor is further configured to:
    determine a secret key value;
    create new session information in a session table comprising the secret key value and a secret key identifier associated with the secret key value; and
    create an association in the session table between the session identifier, the secret key value, and the secret key identifier,
    wherein the secret key value and the secret key identifier are retrievable from the session table based upon the session identifier.

22. A non-transitory machine-readable medium for a computer system, the non-transitory machine-readable medium having stored thereon a series of instructions executable by a processor, the series of instructions comprising:
    instructions that cause the processor to receive, at a first web service application configured as a client application to a second web server application or group of web services, a first request to send a first web service message to the second web service application or group of web services;
    instructions that cause the processor to retrieve first existing communication session information from a database accessible to the first web service application storing one or more existing communication sessions, the first existing communication session information having the same sharing characteristics as the first request and generated in response to a second web service message associated with different credentials than that associated with the first web service message,
    wherein the sharing characteristics of the first request comprises environment information associated with the first web service application, request information associated with the first request, or a combination thereof, that includes first user credentials of a first user and a service locator identifying the second web service application or group of web services to invoke, and wherein instructions that cause the processor to retrieve the first existing communication session information comprise instructions that cause the processor to search the one or more existing communication sessions for the first existing communication session information being associated with the service locator and security credentials including second user credentials of a second user; and instructions that cause the processor to communicate the first web service message from the first web service application to the second application or group of web services using the first existing communication session information.

* * * * *

UNITED STATES PATENT AND TRADEMARK OFFICE
CERTIFICATE OF CORRECTION

Page 1 of 1

PATENT NO. : 8,782,757 B2
APPLICATION NO. : 13/461719
DATED : July 15, 2014
INVENTOR(S) : Kavantzas et al.

It is certified that error appears in the above-identified patent and that said Letters Patent is hereby corrected as shown below:

In the Specification,

In column 3, line 14, delete "a the" and insert -- the --, therefor.

In column 3, line 48, delete "to a to a" and insert -- to a --, therefor.

In column 19, line 17, delete "invocations" and insert -- invocations. --, therefor.

In column 22, line 30, delete "computer, causes" and insert -- computer causes --, therefor.

In column 23, line 15, delete "146. execution" and insert -- 146 execution --, therefor.

In column 25, line 44, delete "block" and insert -- Block --, therefor.

Signed and Sealed this
Tenth Day of March, 2015

Michelle K. Lee
*Deputy Director of the United States Patent and Trademark Office*